(12) United States Patent
Iguchi et al.

(10) Patent No.: US 11,917,293 B2
(45) Date of Patent: Feb. 27, 2024

(54) IMAGING DEVICE

(71) Applicant: Panasonic Intellectual Property Management Co., Ltd., Osaka (JP)

(72) Inventors: Takuya Iguchi, Osaka (JP); Motonori Ogura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/857,898

(22) Filed: Jul. 5, 2022

(65) Prior Publication Data
US 2023/0008588 A1    Jan. 12, 2023

(30) Foreign Application Priority Data

Jul. 8, 2021 (JP) .................................. 2021-113678
Apr. 28, 2022 (JP) .................................. 2022-075278

(51) Int. Cl.
*H04N 23/67* (2023.01)
*H04N 23/80* (2023.01)
*H04N 23/63* (2023.01)

(52) U.S. Cl.
CPC ......... *H04N 23/675* (2023.01); *H04N 23/635* (2023.01); *H04N 23/80* (2023.01)

(58) Field of Classification Search
CPC .... H04N 23/675; H04N 23/635; H04N 23/80; H04N 23/611; H04N 23/673; H04N 23/60
See application file for complete search history.

(56) References Cited

U.S. PATENT DOCUMENTS

| | | |
|---|---|---|
| 2005/0189419 A1 | 9/2005 | Igarashi et al. |
| 2010/0321515 A1 | 12/2010 | Imamura |
| 2011/0033085 A1 | 2/2011 | Kubota |
| 2018/0098057 A1 * | 4/2018 | Heo ................... G06V 40/167 |
| 2021/0227145 A1 | 7/2021 | Kasugai |

FOREIGN PATENT DOCUMENTS

| | | |
|---|---|---|
| JP | 2005-269604 A | 9/2005 |
| JP | 2010-008620 A | 1/2010 |
| JP | 2011-002690 A | 1/2011 |
| JP | 2011-039596 A | 2/2011 |
| JP | 2021-114716 A | 8/2021 |

\* cited by examiner

*Primary Examiner* — Yogesh K Aggarwal
(74) *Attorney, Agent, or Firm* — Renner, Otto, Boisselle & Sklar, LLP

(57) ABSTRACT

An imaging device includes an image sensor configured to capture a subject image at a predetermined frame rate and generate imaging data for each frame; and a controller configured to control a display to display a captured image corresponding to the imaging data for each frame, wherein first follow-up information can be displayed on the captured image in the display with a frame delay to indicate a result of a first follow-up operation of following a subject on the captured image, and the controller generates second follow-up information that is displayed in a delay period shorter than the frame delay of the first follow-up information to indicate a result of a second follow-up operation different from the first follow-up operation.

10 Claims, 17 Drawing Sheets

Fig.5B

EVALUATION VALUE DISTRIBUTION MAP (DEVIATION VALUE DATA) M

| 1.366 | 1.355 | 1.214 | 0.587 | 0.510 | 0.550 | 0.407 | 0.363 | -1.167 | -1.342 | -1.335 | -1.336 | -1.321 | -0.361 | 0.426 | 0.417 |
| 1.223 | 1.425 | 1.223 | 0.429 | 0.471 | 0.381 | 0.259 | 0.287 | -1.333 | -1.335 | -1.316 | -1.337 | -1.330 | -0.337 | 0.828 | 0.816 |
| 1.287 | 1.349 | 1.192 | 0.359 | 0.328 | 0.418 | 0.424 | 0.338 | -0.169 | -1.322 | -1.332 | -1.333 | -0.639 | -0.722 | 0.810 | 0.882 |

30B (30)

IMAGING DEVICE

BACKGROUND

Technical Field

The present disclosure relates to an imaging device that performs an operation of following a subject in a focusing operation or the like.

Description of the Related Art

JP 2011-2690 A discloses a digital camera having an autofocus (AF) function. The digital camera of JP 2011-2690 A has a face recognition function of recognizing the face of a subject as a function related to the autofocus function. Autofocus can be executed targeting a face region of the subject recognized by the face recognition function.

SUMMARY

The present disclosure provides an imaging device that enables a user to easily use a follow-up operation having high followability to a subject.

An imaging device according to the present disclosure includes: an image sensor configured to capture a subject image at a predetermined frame rate and generate imaging data for each frame; and a controller configured to control a display to display a captured image corresponding to the imaging data for each frame, wherein first follow-up information can be displayed on the captured image in the display with a frame delay to indicate a result of a first follow-up operation of following a subject on the captured image, and the controller generates second follow-up information that is displayed in a delay period shorter than the frame delay of the first follow-up information to indicate a result of a second follow-up operation different from the first follow-up operation.

According to the imaging device of the present disclosure, it is possible for the user to easily use the follow-up operation (for example, second follow-up operation) having high followability to the subject.

BRIEF DESCRIPTION OF THE DRAWINGS

FIG. 5B is a view illustrating an evaluation value map used in the AF operation of the digital camera according to the first embodiment;

DESCRIPTION OF THE PREFERRED EMBODIMENT

An embodiment will be described below in detail with reference to the drawings as appropriate. However, description more detailed than necessary may be omitted. For example, there is a case of omitting a detailed description of a well-known matter and a redundant description of substantially the same configuration. This is to avoid the following description from becoming unnecessarily redundant and to facilitate understanding by those skilled in the art. Note that the inventor(s) provides the accompanying drawings and the following description in order for those skilled in the art to fully understand the present disclosure, and does not intend to limit the subject matter described in the claims by these.

First Embodiment

In the first embodiment, as an example of an imaging device according to the present disclosure, a digital camera that recognizes a subject based on an image recognition technology and controls a focusing operation will be described.

[1-1. Configuration]

The configuration of the digital camera according to the first embodiment will be described with reference to FIG. 1.

Figure 1:
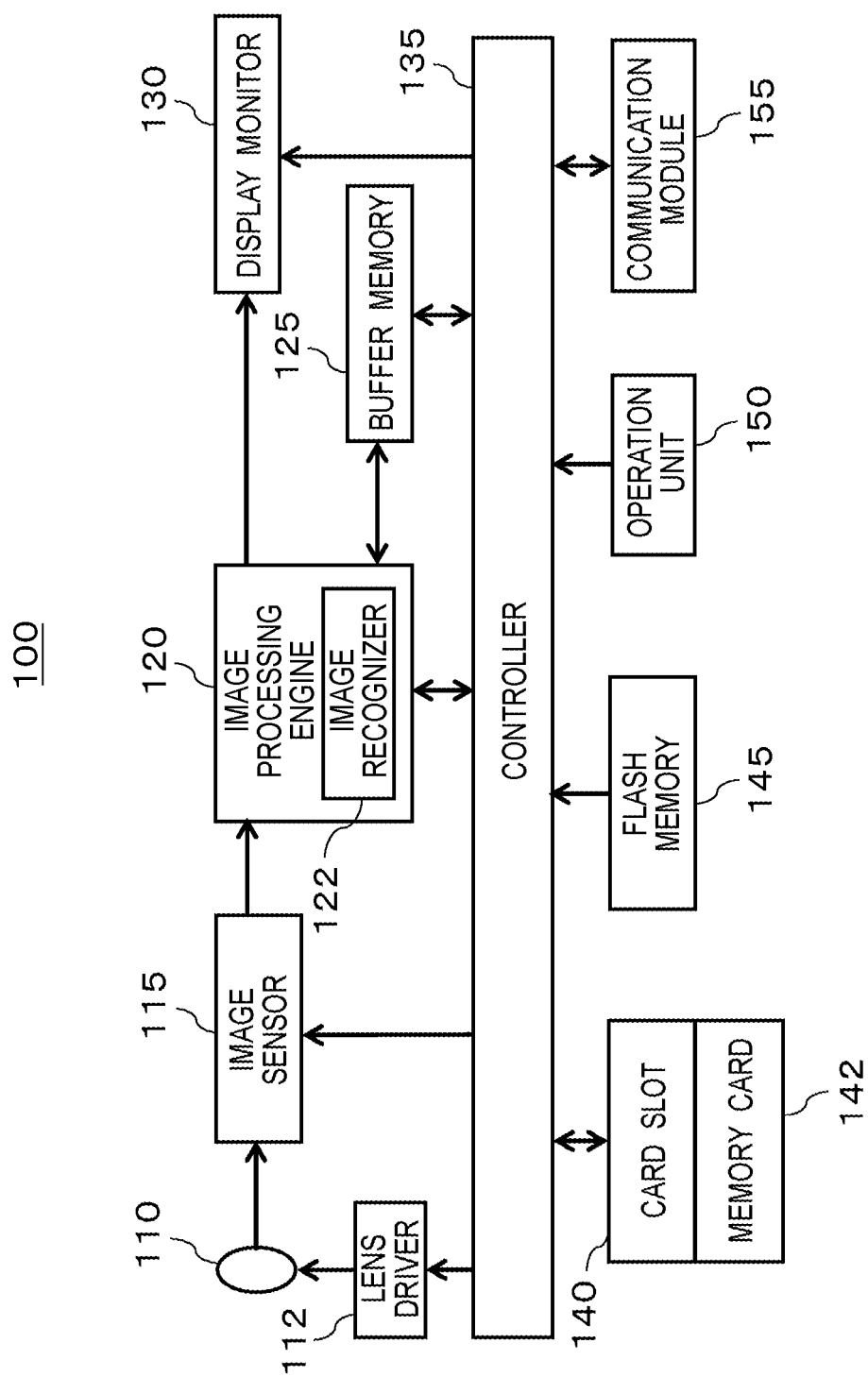
FIG. 1 is a view illustrating a configuration of a digital camera according to a first embodiment of the present disclosure.

FIG. 1 is a view illustrating the configuration of a digital camera 100 according to the present embodiment. The digital camera 100 according to the present embodiment includes an image sensor 115, an image processing engine 120, a display monitor 130, and a controller 135. The digital camera 100 further includes a buffer memory 125, a card slot 140, a flash memory 145, an operation unit 150, and a communication module 155. The digital camera 100 includes, for example, an optical system 110 and a lens driver 112.

The optical system 110 includes a focus lens, a zoom lens, an optical image stabilizer lens (OIS), a diaphragm, and a shutter. The focus lens is a lens for changing a focus state of the subject image formed on the image sensor 115. The zoom lens is a lens for changing magnification of the subject image formed on the image sensor 115. Each of the focus lenses or the like includes one lens or a plurality of lenses.

The lens driver 112 drives the focus lens and the like in the optical system 110. The lens driver 112 includes a motor to move the focus lens along an optical axis of the optical system 110 under the control of the controller 135. The configuration for driving the focus lens in the lens driver 112 can be achieved by a DC motor, a stepping motor, a servo motor, an ultrasonic motor, or the like.

The image sensor (that is, image sensor) 115 captures a subject image formed via the optical system 110 and generates imaging data (that is, RAW data). The imaging data constitutes image data indicating a captured image by the image sensor 115. The image sensor 115 generates imaging data for each frame at a predetermined frame rate (for example, 30 frames/sec). The generation timing of the imaging data and the electronic shutter operation in the image sensor 115 are controlled by the controller 135. As the image sensor 115, various image sensors such as a CMOS image sensor, a CCD image sensor, or an NMOS image sensor can be used.

The image sensor 115 performs an operation of capturing a still image, an operation of capturing a through-the-lens image, and the like. The through-the-lens image is mainly a moving image, and is displayed on the display monitor 130 in order for the user to determine a composition for capturing a still image. Each of the through-the-lens image and the still image is an example of a captured image in the present embodiment.

The image processing engine 120 performs various types of processing on the imaging data (that is, RAW data) output from the image sensor 115 to generate image data, and performs various types of processing on the image data to generate an image to be displayed on the display monitor 130. Examples of the various types of processing include, but are not limited to, white balance correction, gamma correction, YC conversion processing, electronic zoom processing, compression processing, and expansion processing. In a case of performing the YC conversion processing, the image processing engine 120 generates YC data based on the imaging data output from the image sensor 115. The YC conversion processing requires, for example, one frame of time. The YC data is used for subject recognition (for example, face recognition) by an image recognizer 122 described later. The image processing engine 120 may be configured by a hard-wired electronic circuit, or may be configured by a microcomputer using a program, a processor, or the like.

In the present embodiment, the image processing engine 120 includes the image recognizer 122 that achieves a subject recognition function by image recognition of a captured image. Details of the image recognizer 122 will be described later.

The display monitor 130 is an example of a display that displays various types of information. For example, the display monitor 130 displays an image (that is, through-the-lens image) indicated by image data captured by the image sensor 115 and subjected to image processing by the image processing engine 120. The display monitor 130 displays a menu screen or the like for the user to perform various types of setting on the digital camera 100. The display monitor 130 can be configured by, for example, a liquid crystal display device or an organic EL device.

The operation unit 150 is a general term for hard keys such as operation buttons and operation levers provided on the exterior of the digital camera 100, and receives an operation by the user. The operation unit 150 includes, for example, a release button, a mode dial, and a touchscreen. Upon receiving an operation by the user, the operation unit 150 transmits, to the controller 135, an operation signal corresponding to the user operation.

The controller 135 integrally controls the entire operation of the digital camera 100. The controller 135 includes a CPU, and the CPU executes a program (software), thereby achieving a predetermined function. The controller 135 may include, in place of the CPU, a processor including a dedicated electronic circuit designed to achieve a predetermined function. That is, the controller 135 can be achieved by various processors such as a CPU, an MPU, a GPU, a DSU, an FPGA, and an ASIC. The controller 135 may include one or a plurality of processors. The controller 135 may include one semiconductor chip together with the image processing engine 120 and the like.

The controller 135 controls a follow-up operation for following the subject on an image for each frame based on imaging data generated by the image sensor 115. The follow-up operation in the first embodiment is a focusing operation (autofocus: AF).

The controller 135 acquires an evaluation value for autofocus based on the imaging data output by the image sensor 115. The acquired evaluation value is an AF detection value obtained from imaging data, and can be calculated during the period of the same frame as the imaging data. The evaluation value of the first embodiment is a contrast value.

The buffer memory 125 is a recording medium that functions as a work memory of the image processing engine 120 and the controller 135. The buffer memory 125 is achieved by a dynamic random access memory (DRAM) or the like. The flash memory 145 is a nonvolatile recording medium. Although not illustrated, the controller 135 may include various internal memories, for example, may incorporate a ROM. The ROM stores various programs to be executed by the controller 135. The controller 135 may incorporate a RAM that functions as a work area of the CPU.

The card slot 140 is a means into which a detachable memory card 142 is inserted. The card slot 140 can be electrically and mechanically connected with the memory card 142. The memory card 142 is an external memory including a recording element such as a flash memory inside. The memory card 142 can store data such as image data generated by the image processing engine 120.

The communication module 155 is a communication module (that is, circuit) that performs communication conforming to the communication standard IEEE 802.11, the Wi-Fi standard, or the like. The digital camera 100 can communicate with other apparatuses via the communication module 155. The digital camera 100 may directly communicate with other apparatuses via the communication module 155, or may communicate via an access point. The communication module 155 may be connectable to a communication network such as the Internet.

[1-1-1. Regarding Image Recognizer]

Details of the image recognizer 122 in the present embodiment will be described below.

The image recognizer 122 adopts a learned model by a neural network such as a convolutional neural network. The image recognizer 122 inputs information (for example, YC data) indicating a captured image Im of the image sensor 115 to a learned model, and executes image recognition processing by the model. The image recognition processing based on the YC data requires, for example, one frame of time. Therefore, for example, two frames are required for YC conversion processing of generating the YC data from the imaging data (that is, RAW data) and image recognition processing based on the YC data. The image recognizer 122 may be configured by cooperation of the image processing engine 120 and the controller 135. The image processing engine 120 as the image recognizer 122 may output a motion amount or the like based on images input in time series.

In the processing of the learned model in the image recognizer 122, for example, position information indicating a region in which the subject classified into any of a plurality of preset categories appears in the input image Im is output in association with each category. The plurality of categories include, for example, human parts such as a human body, a face, and a pupil, and animal parts such as an animal body, a face, and a pupil. The position information is defined by, for example, horizontal coordinates and vertical coordinates on the image Im that is the processing target, and indicates, for example, a region surrounding the recognized subject in a rectangular shape (illustrated as a face region F by a one-dot chain line in FIG. 2A).

The learned model of the image recognizer 122 as described above can be obtained, for example, by supervised learning using, as training data, image data associated with a correct answer label that takes an image in which the subject of each category appears as correct. The learned model may generate reliability or likelihood regarding the recognition result of each category.

The learned model of the image recognizer 122 is not limited to the neural network, and may be a machine learning model regarding various types of image recognition. The image recognizer 122 may adopt various types of image recognition algorithms, not limited to machine learning. The image recognizer 122 may be configured such that recognition for some categories such as a human face and pupil is performed by rule-based image recognition processing. The image recognizer 122 may recognize the motion of the subject by various algorithms such as depth from defocus (that is, DFD), tracking, and ME. The image recognizer 122 may include, for example, a DSP or the like. The image recognizer 122 may be configured separately from the image processing engine 120, or may be configured integrally with the controller 135.

The image recognizer 122 of the first embodiment is a face recognizer that recognizes a human face that is a subject. The controller 135 may cause the display monitor 130 to display the "face region" corresponding to the face of the subject based on the position information of the face recognized by image recognizer 122, which is a face recognizer.

[1-2. Operation]

The operation of the digital camera 100 configured as described above will be described below.

The digital camera 100 captures, by the image sensor 115, a subject image formed via the optical system 110 and generates imaging data (that is, RAW data). The image processing engine 120 performs various types of processing on the imaging data generated by the image sensor 115 to generate image data. For example, in an operation of capturing a still image, the controller 135 records image data generated by the image processing engine 120 into the memory card 142 inserted into the card slot 140.

The digital camera 100 causes the display monitor 130 to display a through-the-lens image in the operation of capturing a moving image or a still image. Based on the through-the-lens image on the display monitor 130, the user can confirm the composition for capturing a moving image or capturing a still image. While the through-the-lens image is displayed, the controller 135 performs a focusing operation of controlling the lens driver 112 to drive the focus lens of the optical system 110. The focusing operation is automatically performed, for example, in an operation of capturing a moving image, and is performed in response to an operation of the release button by the user in an operation of capturing a still image.

When the focusing operation as described above is performed, the digital camera 100 of the present embodiment recognizes the subject by image recognition for the captured image Im such as a through-the-lens image, for example, and sets a focusing region indicating an image region of a range of the target of focusing on the captured image Im according to the recognized subject. The focusing region may be referred to as "AF region". An outline of the operation of the digital camera 100 according to the present embodiment will be described with reference to FIGS. 2A and 2B.

Figure 2A:
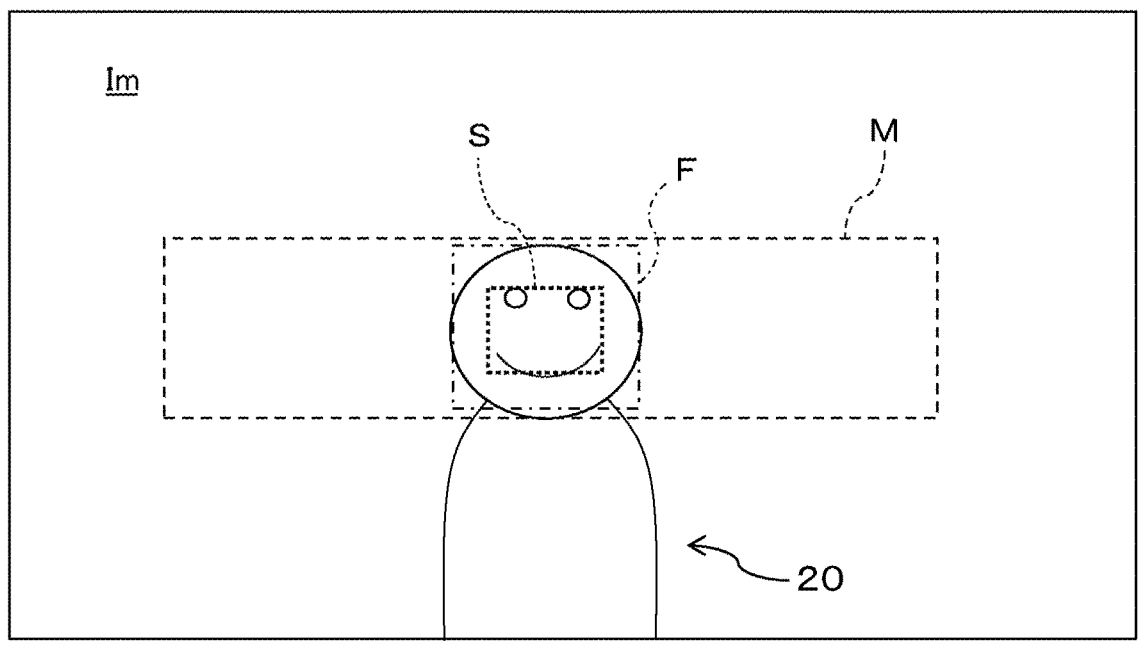
FIG. 2A is a view illustrating an example of a captured image including a subject of the digital camera according to the first embodiment.
Figure 2B:
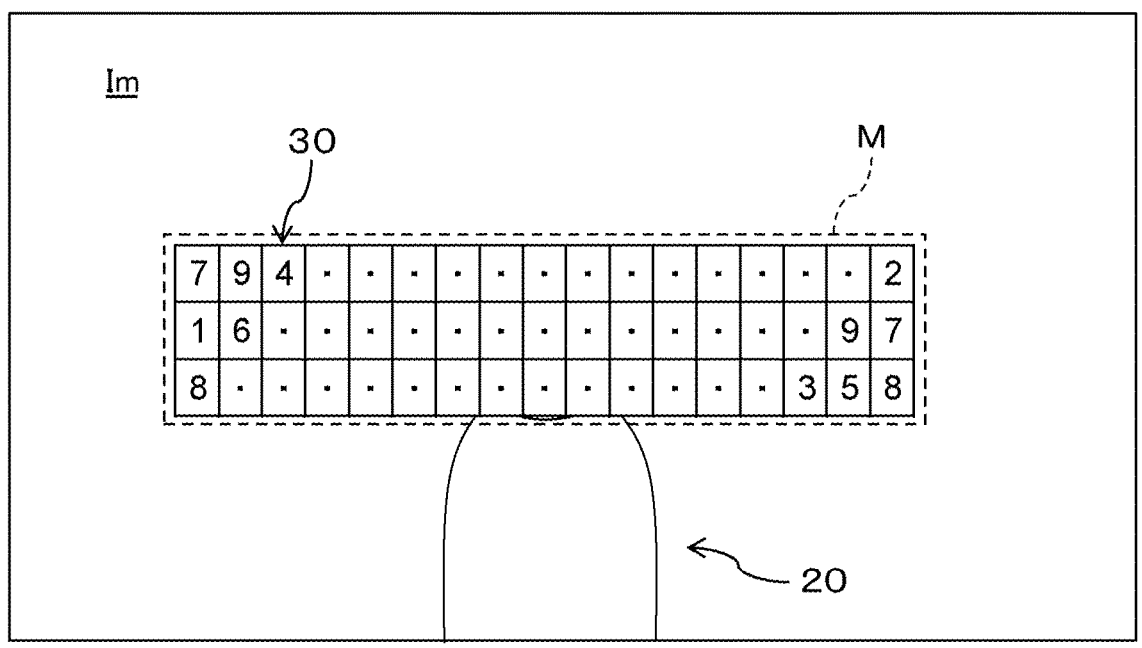
FIG. 2B is a view illustrating an example of a captured image including the subject of the digital camera according to the first embodiment.

FIGS. 2A and 2B are views illustrating an example of the captured image Im including a subject 20 of the digital camera 100. Note that the captured image Im illustrated in FIGS. 2A and 2B is not displayed as it is on the display monitor 130, and display of region information of a map region M described later and evaluation value distribution information 30, numerical information in the evaluation value distribution information 30, and the like may be omitted.

The digital camera 100 specifies the face region F (shown in FIG. 2A) corresponding to the face of the subject 20 in the image recognizer 122. The digital camera 100 sets the map region M (shown in FIGS. 2A and 2B) in the controller 135 in parallel with the specification of the face region F. The map region M is a target region for acquiring the evaluation value distribution information 30 (shown in FIG. 2B) as distribution information indicating the distribution of the evaluation values. In FIG. 2A, the evaluation value distribution information 30 is not illustrated. The evaluation value distribution information 30 may be referred to as "evaluation value map 30". The map region M is a "candidate region" for selecting an AF selection region S (shown in FIG. 2A) described later based on the evaluation value of the evaluation value distribution information 30.

Each evaluation value constituting the evaluation value distribution information 30 illustrated in FIG. 2B is an AF detection value (for example, a contrast value) obtained from RAW data generated by the image sensor 115. That is the AF detection value of the current frame. In FIG. 2B, schematic AF detection values are illustrated in some regions (that is, cells) of the evaluation value distribution information 30, and numerical values are not illustrated in other regions.

As described above, the face recognition processing based on RAW data takes time of several frames (for example, two frames), and frame delay occurs in the face region F. On the other hand, the evaluation value of the evaluation value distribution information 30 acquired in the map region M is an AF detection value obtained from the RAW data of the current frame, and is not affected by the frame delay.

The digital camera 100 selects the AF selection region S for use in the focusing region based on the evaluation value distribution information 30 in the map region M. The AF selection region S is a "subject region" indicating a follow-up result of the subject 20 in each frame. A specific selection method of the AF selection region S will be described later. The digital camera 100 executes the focusing operation using the evaluation value of the evaluation value distribution information 30 in the selected AF selection region S.

According to the above method, since the AF selection region S (that is, focusing region) is selected based on the AF detection value that is the evaluation value of the current frame for executing the focusing operation, the focusing operation can be executed while reducing influence of the frame delay. This makes it possible to execute the focusing operation while accurately following the subject 20 even in a case where the subject 20 moves, thereby achieving an autofocus function having high followability to the subject 20.

For the face region F, only the position information of the face region F is used to determine the reference position of the map region M. For example, the controller 135 sets the map region M based on the center position of the face region F. The controller 135 may use the position information of the face region F when selecting a reference cell Sa (shown in FIG. 6A) of the AF selection region S.

Figure 3A:
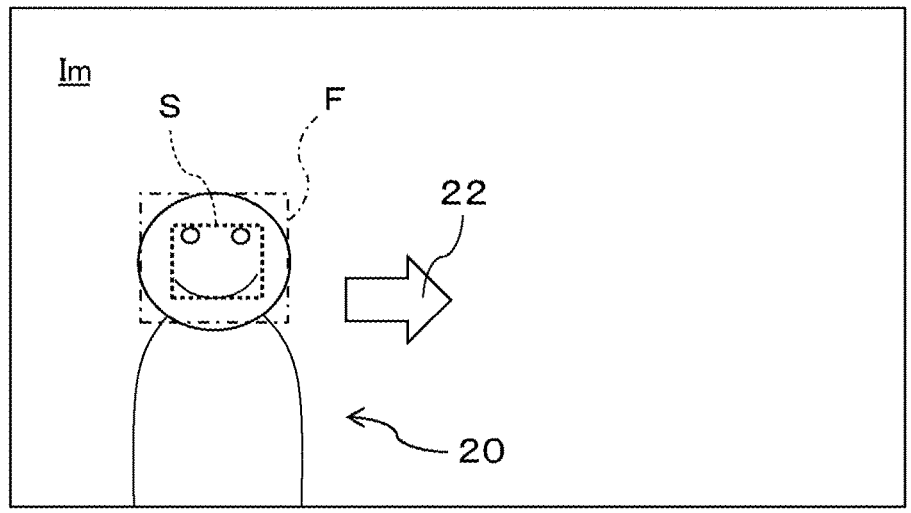
FIG. 3A is a view for describing an outline of an operation of the digital camera according to the first embodiment.
Figure 3B:
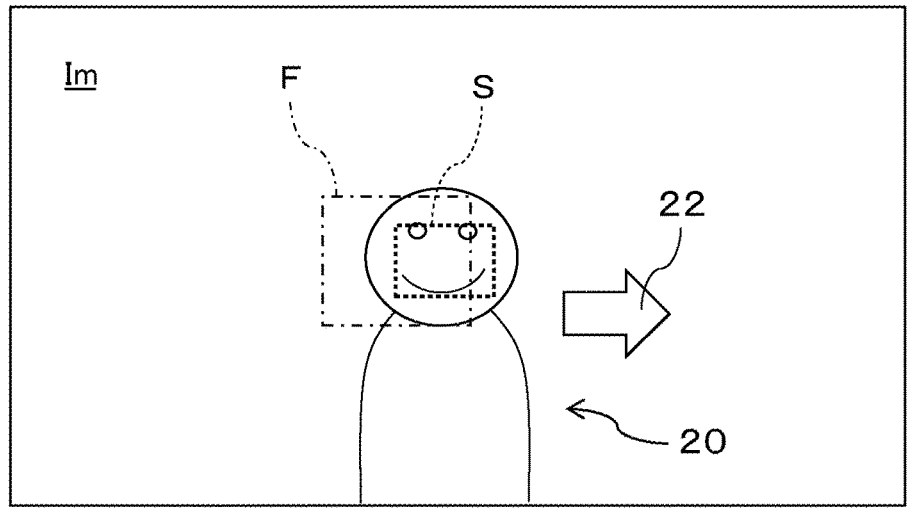
FIG. 3B is a view for describing an outline of the operation of the digital camera according to the first embodiment.
Figure 3C:
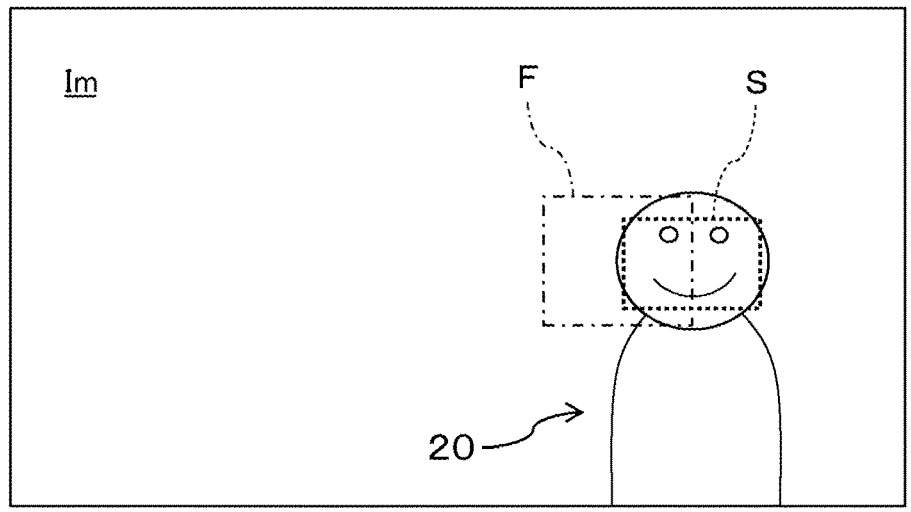
FIG. 3C is a view for describing an outline of the operation of the digital camera according to the first embodiment.

FIGS. 3A to 3C are views illustrating an example of a series of captured images Im over a plurality of frames in a case where the subject 20 moves.

First, the subject 20 starts to move from the state illustrated in FIG. 3A (as shown by arrow 22). If the subject 20 remains still, the face region F, which is the recognition result of the image recognizer 122, is less affected by the frame delay, and is likely to substantially overlap the face of the subject 20. In the example illustrated in FIG. 3A, the AF selection region S selected based on the evaluation value distribution information 30 also overlaps the face of the subject 20. When the subject 20 moves from this state shown in FIG. 3A, as illustrated in FIG. 3B, the face region F starts to shift to the opposite side (that is, left side) with respect to the motion (that is, right side) of the subject 20 due to the influence of the frame delay. The faster the motion of the subject 20 becomes, the larger the position shift of the face region F becomes. When the face region F greatly shifts from the face of the subject 20 as illustrated in FIG. 3C, the proportion including the background and the like around the subject 20 becomes higher than that of the range including the face of the subject 20. When the focusing operation is executed with the face region F as the focusing region in such state, not the face of the subject 20 but the background or the like is likely to be focused, and the desired subject 20 is sometimes not focused.

On the other hand, the AF selection region S selected by the controller 135 of the first embodiment is a region selected based on the evaluation value (that is, AF detection value) of the current frame, and the influence of the frame delay can be suppressed. As illustrated in FIGS. 3A to 3C, the AF selection region S accurately follows the motion of the subject 20. By executing the focusing operation using the evaluation value (that is, evaluation value distribution information 30) of the current frame in the AF selection region S, the focusing operation can be executed while accurately following the subject 20 even in a case where the subject 20 moves, thereby achieving the autofocus function with high followability to the subject 20.

The controller 135 may cause the display monitor 130 to display the captured image Im including the AF selection region S as illustrated in FIGS. 3A to 3C. By displaying the AF selection region S that is hardly affected by the frame delay and has high followability to the subject 20, it is possible to give the user a sense of security and improve convenience. Display of the face region F may be omitted. In other words, the face region F (that is, first follow-up information/first display information) indicating the result of the first follow-up operation and the AF selection region S (that is, second follow-up information/second display information) indicating the result of the second follow-up operation may be simultaneously displayed, or only the AF selection region S may be displayed without displaying the face region F. The display method of the second follow-up information is not limited to the case of displaying the AF selection region S as illustrated in FIGS. 3A to 3C, and other display forms may be adopted. A specific display method will be described later.

Hereinafter, the operation of the digital camera 100 of the present embodiment will be described in detail.

[1-2-2. Details of Operation 1]

Details of the AF operation of the digital camera 100 according to the present embodiment will be described with reference to FIGS. 4 to 7. Hereinafter, as an example of the operation of the digital camera 100, an operation of moving image shooting in an automatic recognition AF mode will be described. In the automatic recognition AF mode, the focusing region is set according to the recognition result of the image recognizer 122 and other information. Note that the present invention is applicable not only to moving image shooting, but also to an auto focus continuous (that is, AFC) mode in still image shooting, through-the-lens image shooting, and the like. The AFC mode is an operation mode in which the digital camera 100 performs the focusing operation such that the focus is continuously adjusted as long as the release button is half-pressed, for example.

Figure 4:
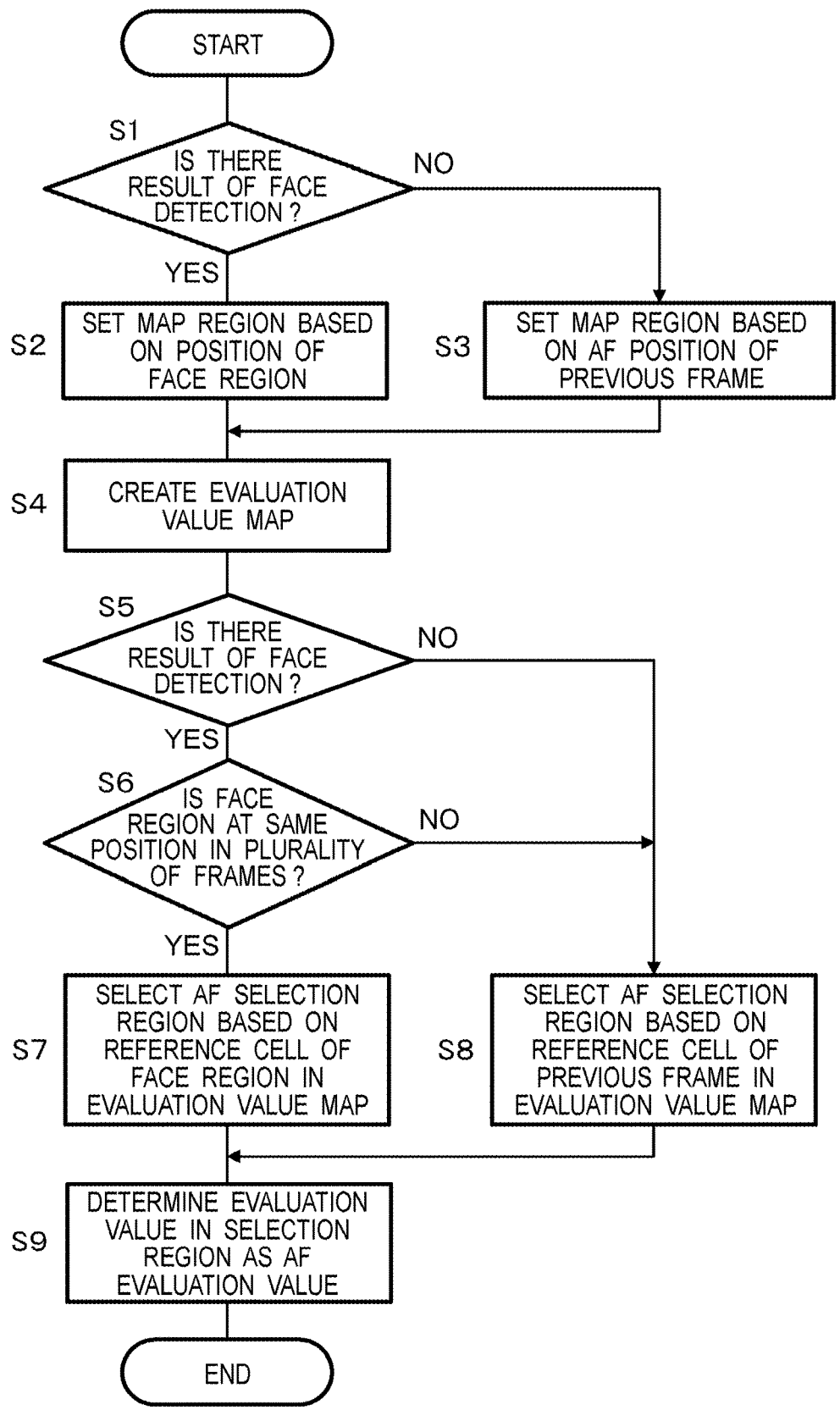
FIG. 4 is a flowchart presenting an example of an AF operation of the digital camera according to the first embodiment.

FIG. 4 is a flowchart presenting an operation example of the automatic recognition AF mode of the digital camera 100 according to the present embodiment.

Each processing according to the flowchart of FIG. 4 is executed for each frame by the controller 135 of the digital camera 100.

First, the controller 135 determines whether or not there is a result of face detection (S1). Specifically, it is determined that there is a result of face detection if information regarding the "face region F", which is the recognition result of the image recognizer 122, has been output (YES in S1), and it is determined that there is no result of face detection if the information has not been output (NO in S1).

When it is determined that there is the result of the face detection (YES in S1), the controller 135 sets the map region M based on the position of the face region F (S2). For example, as exemplified in FIG. 2A, the controller 135 sets the substantially rectangular map region M having substantially the same longitudinal width as the face region F and a lateral width several times (for example, 3 to 5 times) the width of the face region F based on the center position of the face region F. Not limited to such a case, any dimensions and shape of the map region M may be adopted as long as the map region M is set based on position information of the face region F.

When setting the map region M based on the position of the face region F, the controller 135 of the first embodiment sets the map region M using the position information of the face region F one frame before. By using the position information of the face region F one frame before, the range of the map region M can be set at the time of transition to the current frame. This makes it possible to execute selection of the AF selection region S together with transition to the current frame. There is a possibility that the position of the face region F one frame before is shifted with respect to the position of the subject 20 in the current frame. However, by setting the map region M to a range wider than the face region F (for example, a region in which the lateral width of the face region F is lengthened by several times), the map region M can be set so as to include a region having a high possibility that the subject 20 in the current frame exists.

On the other hand, when it is determined that there is no result of face detection (NO in S1), the controller 135 sets the map region M based on the AF position of the previous frame (S3). This makes it possible to set the map region M by a simple method even in a case where the face region F is not specified. Similarly to step S2, by setting the range of the map region M to a range wider than the face region F, the map region M can be set so as to include a region having a high possibility that the subject 20 in the current frame exists.

In the map region M, the controller 135 creates an "evaluation value map" regarding the distribution information of the evaluation values (that is, evaluation value distribution information 30) (S4). Here, the creation method of the evaluation value map will be described with reference to FIGS. 5A and 5B.

Figure 5A:
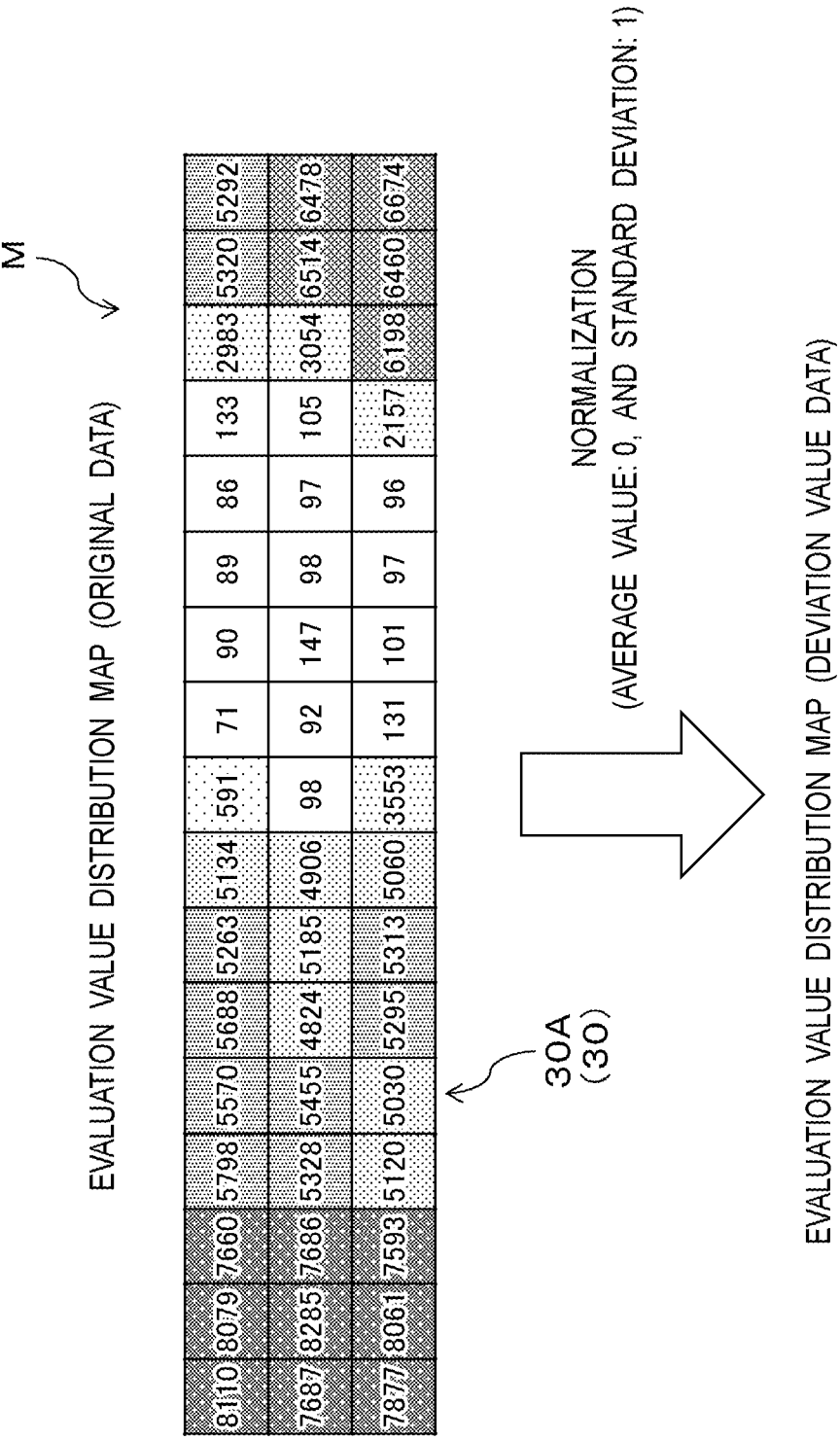
FIG. 5A is a view illustrating an evaluation value map used in the AF operation of the digital camera according to the first embodiment.

FIGS. 5A and 5B are exemplary views for describing the creation method of the evaluation value map. As illustrated in FIG. 5A, the map region M set in steps S1 and S2 includes a plurality of regions (that is, cells), and the controller 135 acquires, for individual cells, an AF detection value (that is, evaluation value) obtained from RAW data generated by the image sensor 115. These AF detection values constitute evaluation value distribution information 30A, which is distribution information of the evaluation values. In such a way, an "evaluation value map" having the evaluation value distribution information 30A is created (hereinafter, also referred to as "evaluation value map 30A"). FIG. 5A describes an exemplary AF detection value. When the AF detection value is a contrast value, the evaluation value map may be referred to as "edge intensity map".

The controller 135 further normalizes the evaluation value of the evaluation value distribution information 30A. For example, the controller 135 normalizes the evaluation value of the evaluation value distribution information 30A so that the average value becomes 0 and the standard deviation becomes 1. As a result, as illustrated in FIG. 5B, evaluation value distribution information 30B based on the deviation value data of the evaluation value is obtained, that is, an evaluation value map 30B is obtained. The controller 135 of the first embodiment selects the AF selection region S using the evaluation value map 30B based on the deviation value data (steps S7 and S8 described later). By using the deviation value data, even in a case where the absolute value of the AF detection value varies depending on the shooting scene or frame, the AF selection region S can be selected while reducing the influence of the variation.

Returning to FIG. 4, the controller 135 determines whether or not there is a result of face detection (S5). The determination method in step S5 is the same as the determination method in step S1, and the description for step S5 will be omitted.

When determining that there is the result of the face detection (YES in S5), the controller 135 determines whether or not the face region F is at the same position in a plurality of previous frames (S6). Specifically, the position shift amount of the face region F in a plurality of frames is calculated, it is determined that the face regions F are at the same position (YES in S6) when the position shift amount is smaller than a predetermined threshold, and it is determined that the face regions F are not at the same position (NO in S6) when the position shift amount is larger than the predetermined threshold. The controller 135 makes the determination based on, for example, the position shift amount between the center position of the face region F in the current frame and the center position of the face region F in one frame before. Note that not only the current frame and the previous frame, but also the position information of the face region F specified in another frame such as past frames, for example, may be considered.

When it is determined that the face region F is at the same position in a plurality of frames (YES in S6), the controller 135 selects the AF selection region S based on the reference cell of the face region F in the evaluation value map 30B (S7). A specific selection method will be described with reference to FIGS. 6A and 6B.

Figure 6A:
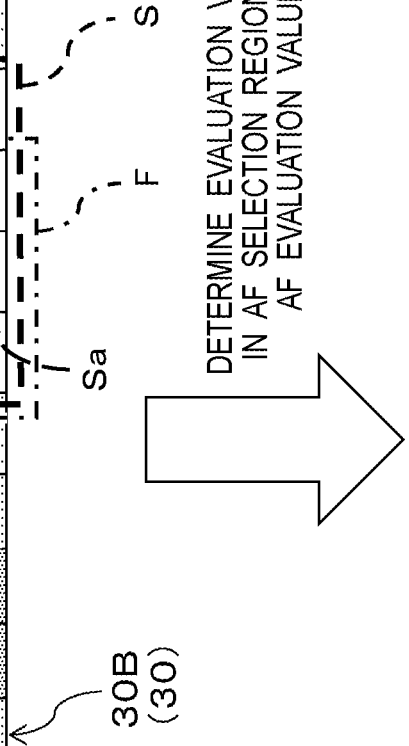
FIG. 6A is a view illustrating an evaluation value map used in the AF operation of the digital camera according to the first embodiment.

As illustrated in FIG. 6A, a cell corresponding to the center of the face region F of the current frame is specified (hereinafter, referred to as "reference cell Sa") in the evaluation value map 30B based on the deviation value data created in step S4. FIG. 6A illustrates a position and a range of the exemplary face region F. The evaluation value included in the reference cell Sa is referred to as "reference evaluation value". In the example illustrated in FIG. 6A, the reference evaluation value is −1.316.

The face region F for determining the reference cell Sa has a frame delay of two frames, but it is determined in step S6 that the face region F is at the same position in a plurality of frames, and it is assumed that there is a high possibility that the subject 20 remains still. Therefore, the position in the current frame where the subject 20 is highly likely to exist can be set as the reference cell Sa.

The controller 135 further selects, as the AF selection region S, a cell having an evaluation value in a range close to the reference evaluation value in the evaluation value map 30B. For example, the controller 135 selects, as the AF selection region S, a cell having an evaluation value within ±10% of the reference evaluation value.

Here, in the region where the face of the subject 20 exists, the AF detection values tend to be close to each other, and to have values different from those in the region such as the background where the subject 20 does not exist. For example, the AF detection value in the region where the subject 20 exists is relatively low, while the AF detection value in the region where the subject 20 does not exist is relatively high. Based on such a tendency, selecting, as the AF selection region S, a cell having an evaluation value within a range near the reference evaluation value of the reference cell Sa, the selected AF selection region S is likely to target the region in the current frame where the face of the subject 20 exists.

The AF selection region S may be selected by using not only within ±10% of the reference evaluation value but also other numerical ranges or references.

Figure 6B:
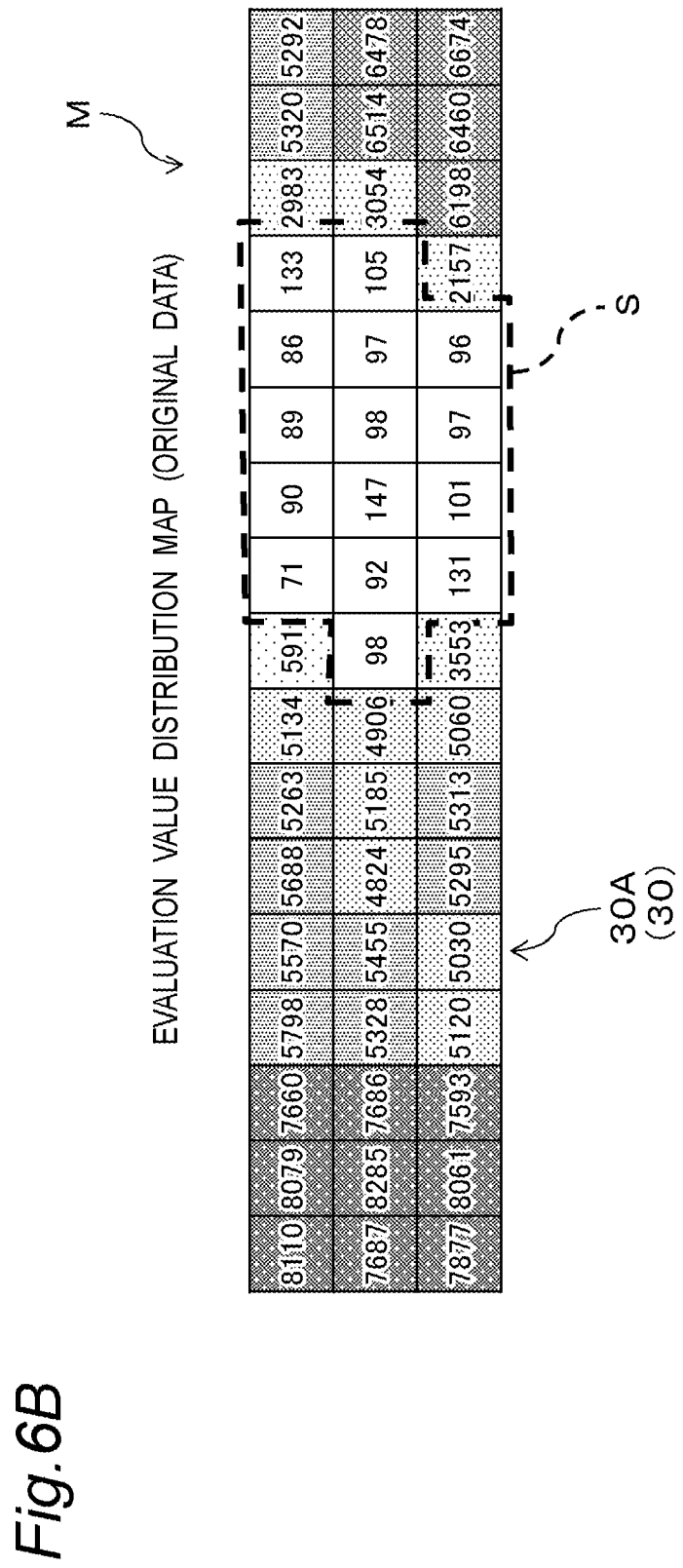
FIG. 6B is a view illustrating an evaluation value map used in the AF operation of the digital camera according to the first embodiment.

The controller 135 sets the evaluation value of the AF selection region S as the AF evaluation value (S9). Specifically, the controller 135 executes the focusing operation using the evaluation value (that is, AF detection value) of the current frame in the AF selection region S. The controller 135 executes the focusing operation using not the evaluation value of the evaluation value map 30B, which is the deviation value data, but the evaluation value of the evaluation value map 30A, which is the original data (that is, AF detection value) before normalization as the AF evaluation value as illustrated in FIG. 6B. By executing the focusing operation using the AF detection value, the focusing operation can be executed while being hardly affected by the frame delay. As a result, even when the subject 20 moves, the focusing operation can be executed while accurately following the subject, and the autofocus function with high followability to the subject 20 can be achieved.

Returning to FIG. 4, when it is determined in step S5 that there is no result of the face detection (NO in S5), the controller 135 selects the AF selection region S based on the reference cell Sa of the AF selection region S of the previous frame in the evaluation value map 30B (S8). Specifically, in the evaluation value map 30B illustrated in FIG. 5B, in place of the center position of the face region F in the current frame, a cell corresponding to the center position of the AF selection region S selected in the previous frame, which is one frame before the current frame, is set as the reference cell Sa. The selection method of the AF selection region S based on the reference evaluation value of the reference cell Sa is similar to that in step S7, and a cell having an evaluation value within a range close to the reference evaluation value is selected as the AF selection region S.

As a result, even when there is no recognition result of the image recognizer 122, the AF selection region S can be selected by a simple method. By determining, as the reference cell Sa, the cell positioned at the center of the AF selection region S selected in the previous frame, the AF selection region S can be selected using, as the reference evaluation value, the evaluation value of a cell in which the face of the subject 20 is highly likely to remain in the current frame.

Even in a case where it is determined in step S5 that there is a result of the face detection (YES in S5), when it is determined that the face region F is not at the same position in a plurality of frames (NO in S6), the controller 135 executes step S8 similarly to a case where it is determined as NO in step S5. In a case where the face region F is not at the same position in the plurality of frames, it is assumed that the subject 20 is in motion, and the face region F is shifted with respect to the subject 20 in the current frame due to the influence of the frame delay as illustrated in FIGS. 3B and 3C. Therefore, by determining the reference cell Sa based on the position information of the AF selection region S of the previous frame in place of the position information of the face region F of the current frame, it is possible to select the AF selection region S using, as the reference evaluation value, the evaluation value of the cell in which the face of the subject 20 is highly likely to remain by a simple method.

Figure 7:
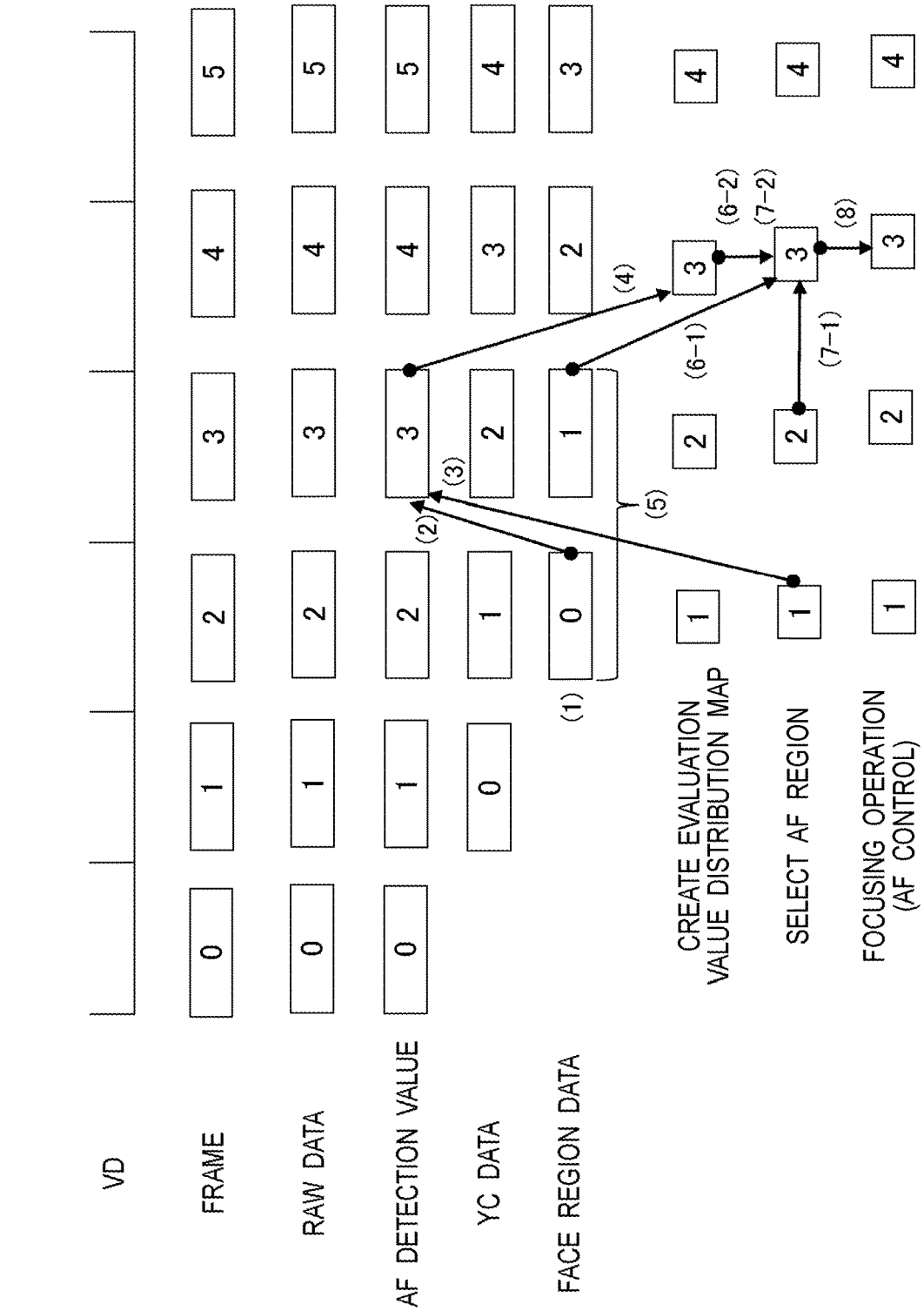
FIG. 7 is a timing chart related to the AF operation presented in the flowchart of FIG. 4.

FIG. 7 illustrates a timing chart related to the operation flow of steps S1 to S9 described above.

In FIG. 7, "VD" indicates a vertical synchronization signal, and "frame" indicates a frame defined by the vertical synchronization signal. In FIG. 7, numerical values of "0" to "5" are exemplified as indices indicating a number of the frame in which the corresponding RAW data is generated.

"RAW data" indicates imaging data output by the image sensor 115. "AF detection value" indicates an AF detection value (that is, evaluation value) obtained from the RAW data. "YC data" indicates YC data generated by performing predetermined arithmetic processing on RAW data. Since the arithmetic processing for generating the YC data takes one frame, the value of "YC data" is delayed by one frame with respect to the RAW data and the AF detection value. "Face region data" indicates data related to the face region F recognized by performing predetermined arithmetic processing on the YC data. Since the arithmetic processing of recognizing the face region data from the YC data takes one frame, the value of "face region data" is delayed by one frame with respect to the YC data, and delayed by two frames with respect to the RAW data and the AF detection value.

Notations (1) to (8) in FIG. 7 indicate which processing of steps S1 to S9 in the flowchart of FIG. 4 corresponds to. Hereinafter, each processing of (1) to (8) will be described.

(1): The controller 135 determines whether or not there is a result of face detection (S1). In the example illustrated in FIG. 7, as a result of face detection of the second frame, face region data (that is, position information of the face region F) corresponding to the RAW data of the 0th frame has been output (YES in S1).

(2): When there is a result of face detection (YES in S1), the controller 135 sets the map region M based on the position of the face region F (S2). In the example illustrated in FIG. 7, the map region M in the third frame is set based on the position information (for example, the center position of the face region F) of the face region F specified in the second frame.

(3): When there is no result of face detection (NO in S1), the controller 135 sets the map region M based on an AF position S1 of the previous frame (S3). In the example illustrated in FIG. 7, the map region M of the third frame is set based on the AF position S1 set in the second frame. The AF position S1 will be described later.

In (2) and (3) described above, when setting the map region M of the third frame, the position information of the face region F or the AF position S1 of the second frame that is the previous frame is used. Therefore, the map region M can be set at the time of transition to the third frame.

(4): The controller 135 creates the evaluation value map 30 (S4). Specifically, the AF detection value that is an output result of the third frame (that is, current frame) is acquired for each cell constituting the map region M set in (2) and (3). As a result, as illustrated in FIG. 5A, the evaluation value map 30A regarding the distribution of the evaluation values of the current frame is obtained. In this way, the evaluation value map 30A can be created in less than one frame. Note that normalization of the evaluation value are performed together with creation of the evaluation value map 30A, and the evaluation value map 30B based on the deviation value data is acquired accordingly. The normalization processing does not require processing time of one frame or more, and thus the evaluation value map 30B can be created together with the creation of the evaluation value map 30A.

(5): The controller 135 determines whether or not the face region F is at the same position in a plurality of frames (S6). In the example illustrated in FIG. 7, the determination is made based on the position information of the face region F in the second frame (that is, previous frame) and the face region F in the third frame (that is, current frame).

(6-1) and (6-2): The controller 135 selects the AF selection region S based on the reference evaluation value of the reference cell Sa of the face region F (S7). In the example illustrated in FIG. 7, in the evaluation value map 30B of the third frame created in (4), a cell corresponding to the center of the face region F specified in the same third frame is determined as the reference cell Sa (as shown in FIG. 6A) (6-1). In the evaluation value map 30B, a cell having an evaluation value within a range close to the reference evaluation value of the reference cell Sa is selected as the AF selection region S (6-2). The normalization processing of evaluation value described above may be a case of executing in accordance with the selection (6-2) of the AF selection region S.

The face region F specified in the third frame is a region corresponding to the AF detection value of the first frame, and a frame delay of two frames occurs. For determining the reference cell Sa, the position information of the center of the face region F is used, but in selection of the AF selection region S, the range is selected using the value (that is, evaluation value distribution information 303) of the third frame that is the current frame. This enables the selection range of the AF selection region S to be hardly affected by frame delay.

(7-1) and (7-2): The controller 135 selects the AF selection region S based on the reference evaluation value of the reference cell Sa of the AF selection region S of the previous frame (S8). In the example illustrated in FIG. 7, in the evaluation value map 30B of the third frame created in (4), a cell corresponding to the center of the AF selection region S selected in the second frame that is the previous frame is determined as the reference cell Sa (7-1). In the evaluation value map 30B, a cell(s) having an evaluation value close to the reference evaluation value of the reference cell Sa is selected as the AF selection region S (7-2).

The AF selection region S selected in the second frame is a region corresponding to the AF detection value of the second frame. Therefore, for determining the reference cell Sa in the evaluation value map 30B of the third frame in (7-1), the position information of the center of the AF selection region S of the previous frame is used, but in selection of the AF selection region S, the range is selected using the value (that is, evaluation value distribution information 30B) of the third frame that is the current frame. This enables the selection range of the AF selection region S to be hardly affected by frame delay.

(8): The controller 135 executes the focusing operation using the evaluation value(s) of the AF selection region S as the AF evaluation value(s) (S9). Specifically, the focusing operation is controlled according to the evaluation values (shown in FIG. 5A) of the evaluation value map 30A in the AF selection region S selected in (6-2) or (7-2). Since the evaluation value is the AF detection value of the third frame that is the current frame, it is possible to prevent it from being affected by frame delay during the focusing operation. As a result, as compared with a case where the focusing operation is executed using the face region F as the focusing region as in the conventional automatic recognition mode, the focusing operation can be executed while being hardly affected by the frame delay. Therefore, it is possible to achieve an autofocus function having high followability to the subject 20, and it makes easier to focus on not an unintended region such as a background but a region (for example, human face) including the desired subject 20.

In particular, the digital camera 100 of the first embodiment executes a contrast-based focusing operation for driving a focus lens, and the magnitude (that is, the absolute value) of the evaluation value may vary between frames. On the other hand, by selecting the AF selection region S and executing the focusing operation using the evaluation value (that is, AF detection value) of the current frame without using the evaluation value itself of the frame before the current frame, the focusing operation can be executed while being not affected by the variation in the evaluation value between the frames. Since the AF selection region S is selected using the evaluation value distribution information 30B based on the deviation value data, the AF selection region S can be selected while being hardly affected also by the variation in the evaluation value due to the shooting scene or the like.

[1-2-3. Details of Operation 2]

Figure 8:
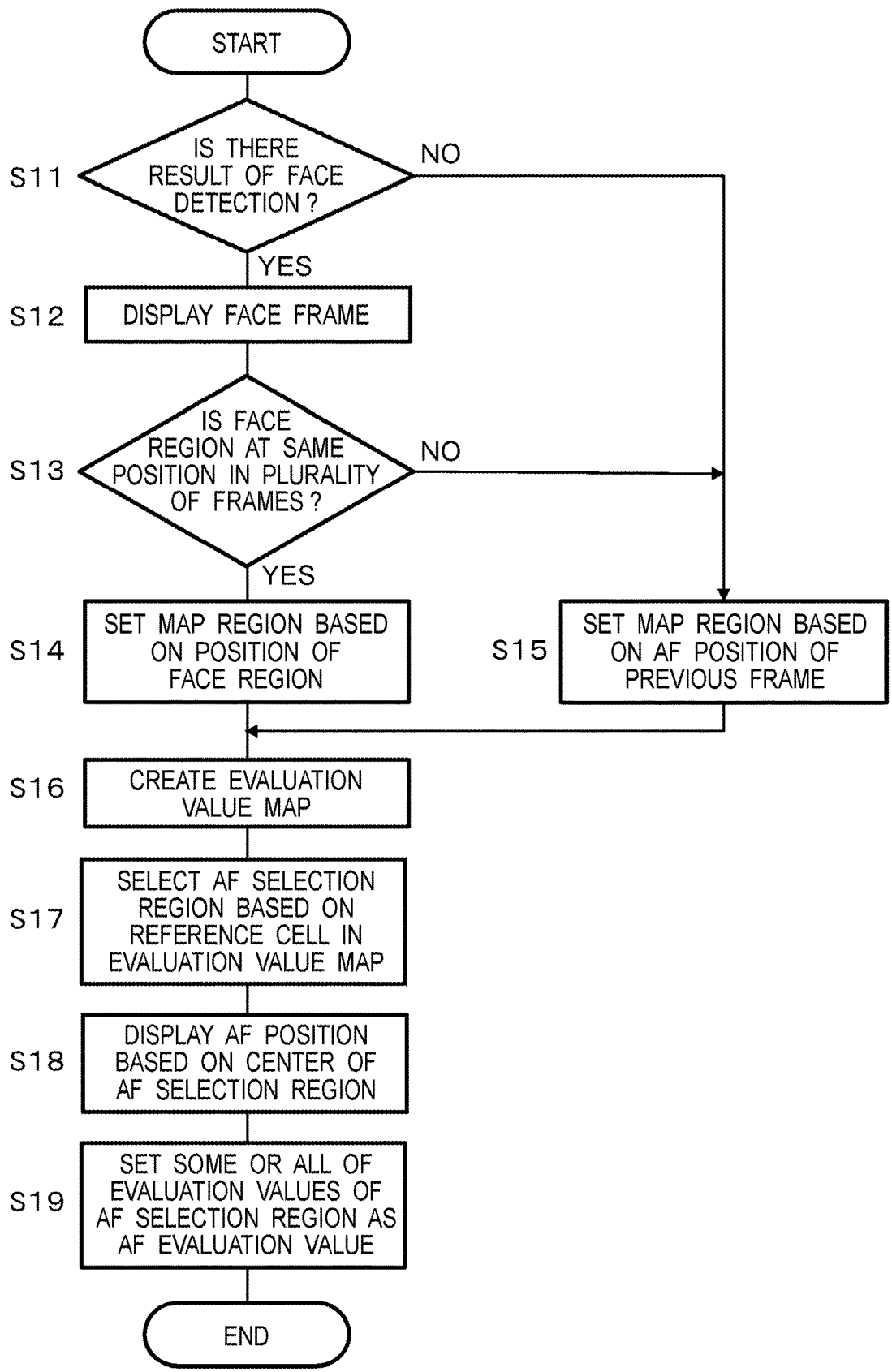
FIG. 8 is a flowchart presenting an example of the AF operation of the digital camera according to the first embodiment.

FIG. 8 is a flowchart presenting an operation example of the automatic recognition AF mode of the digital camera 100 according to the first embodiment. In the flowchart illustrated in FIG. 4 of the first embodiment, detailed description of display of the face region F, the map region M, and the AF selection region S is omitted. However, in the flowchart illustrated in FIG. 8, steps related to display of the face region F and the AF position S1 (corresponding to the AF selection region S) are described (S12 and S18).

First, the controller 135 determines whether or not there is a result of face detection (S11), similarly to the processing of step S1 in FIG. 4, for example.

If it is determined that there is a result of the face detection (YES in S11), the controller 135 causes the display monitor 130 to display a face frame (that is, face region F) (S12). A frame delay of two frames or more (for example, three frames) occurs in the display of the face region F.

The controller 135 determines whether or not the face region F is at the same position in a plurality of frames (S13), similarly to the processing of step S6 in FIG. 4, for example.

When it is determined that the face region F is at the same position in the plurality of frames (YES in S13), the controller 135 sets the map region M based on the position of the face region F (S14), similarly to the processing of step S2 in FIG. 4, for example.

When it is determined that the face region F is not at the same position in the plurality of frames (NO in S13), or when it is determined that there is no result of the face detection (NO in S11), the controller 135 sets the map region M based on the AF position of the previous frame (S15), similarly to the processing of step S3 in FIG. 4, for example.

The controller 135 creates an evaluation value map in the map region M (S16), similarly to the processing of step S4 in FIG. 4, for example.

The controller 135 selects the AF selection region S based on the reference cell in the evaluation value map (S17), similarly to the processing of steps S7 and S8 in FIG. 4, for example.

Figure 9A:
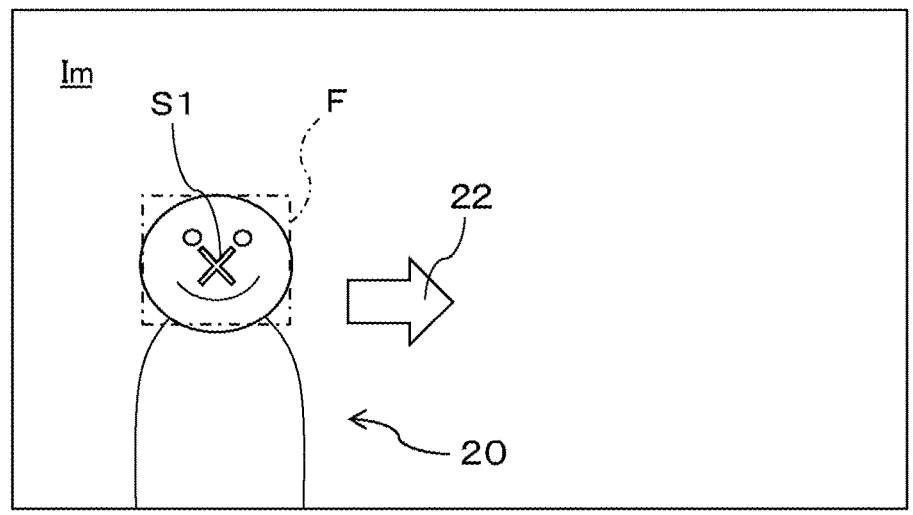
FIG. 9A is a view for describing an outline of the operation of the digital camera according to the first embodiment.
Figure 9B:
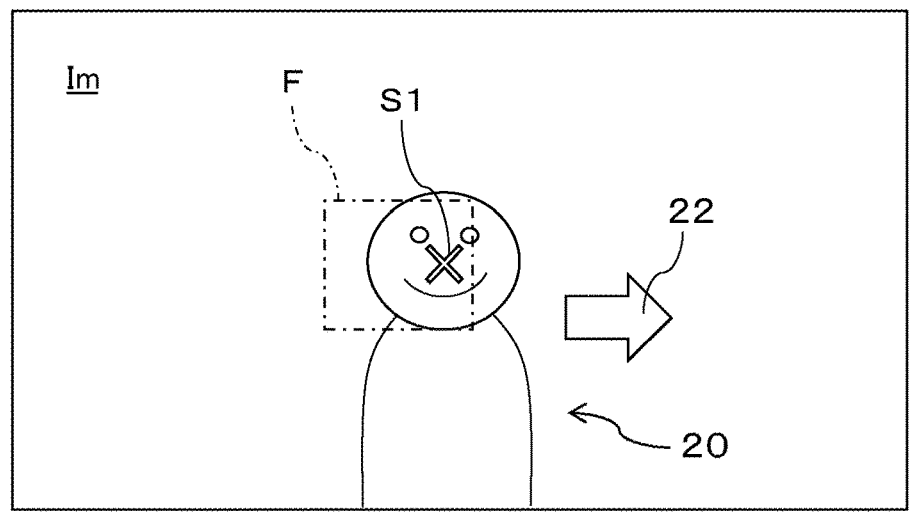
FIG. 9B is a view for describing an outline of the operation of the digital camera according to the first embodiment.
Figure 9C:
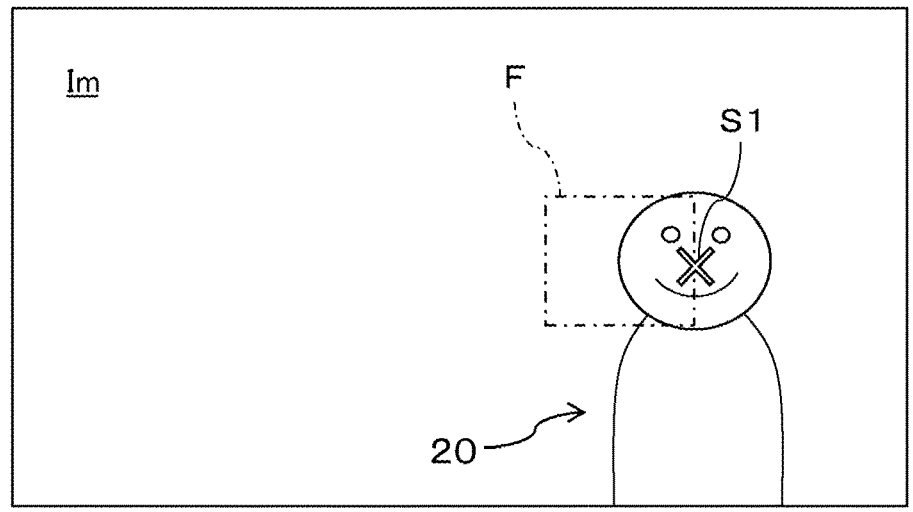
FIG. 9C is a view for describing an outline of the operation of the digital camera according to the first embodiment.

The controller 135 displays the AF position S1 on the display monitor 130 based on the center of the AF selection region S (S18). Specifically, as illustrated in FIGS. 9A to 9C, on the captured image Im of the display monitor 130, the AF position S1 is displayed to be superimposed on the center position of the AF selection region S (not displayed) determined in step S17. By displaying the AF position S1 indicating the representative position of the AF selection region S onto the captured image Im, the user can easily recognize that the follow-up operation (that is, focusing operation) with high followability to the subject 20 is being executed.

In step S18, the AF position S1 is displayed as a graphic different from that of the face region F (that is, face frame).

In the example illustrated in FIGS. 9A to 9C, the graphic of the AF position S1 is a cross mark, and the AF position S1 is displayed such that the center of the cross mark overlaps the center of the AF selection region S. By displaying the AF position S1 with a graphic different from that of the face region F, the AF position S1 having a relatively small frame delay can be easily distinguished, and it can be more easily understood that the focusing operation having high followability is being performed. The graphic representing the AF position S1 may be other graphic (for example, a circle, a rhombus, or the like) as long as the graphic has a graphic different from that of the face region F.

In step S18 described above, the AF selection region S itself is not displayed, and the AF position S1 is displayed in place of the AF selection region S. The AF position S1 can be continuously displayed in the same shape, and can be a display easy to understand for the user. By displaying both the face region F and the AF position S1, it is possible to indicate to the user that the digital camera 100 has recognized the face region F.

Similarly to the processing of step S9 in FIG. 4, for example, the controller 135 sets some or all of the evaluation values of the AF selection region S as the AF evaluation value (S19). Among the evaluation values included in each cell of the AF selection region S, the evaluation values of all the cells may be as the AF evaluation values, or the evaluation values of only some of the cells may be as the AF evaluation values.

Regarding the processing of steps S11 to S19 described above, for example, the AF position S1 displayed in step S18 does not need to be always displayed on the display monitor 130, and there may be a timing at which the AF position S1 is not displayed depending on conditions. Alternatively, the display of the face frame by step S12 may be omitted, and only the AF position S1 by step S18 may be displayed. The center of the AF position S1 displayed in step S18 does not necessarily overlap the center of the AF selection region S, and the center of the AF position S1 and the center of the AF selection region S may be shifted from each other. That is, the display place of the AF position S1 is only required to be determined based on the center of the AF selection region S.

Figure 10:
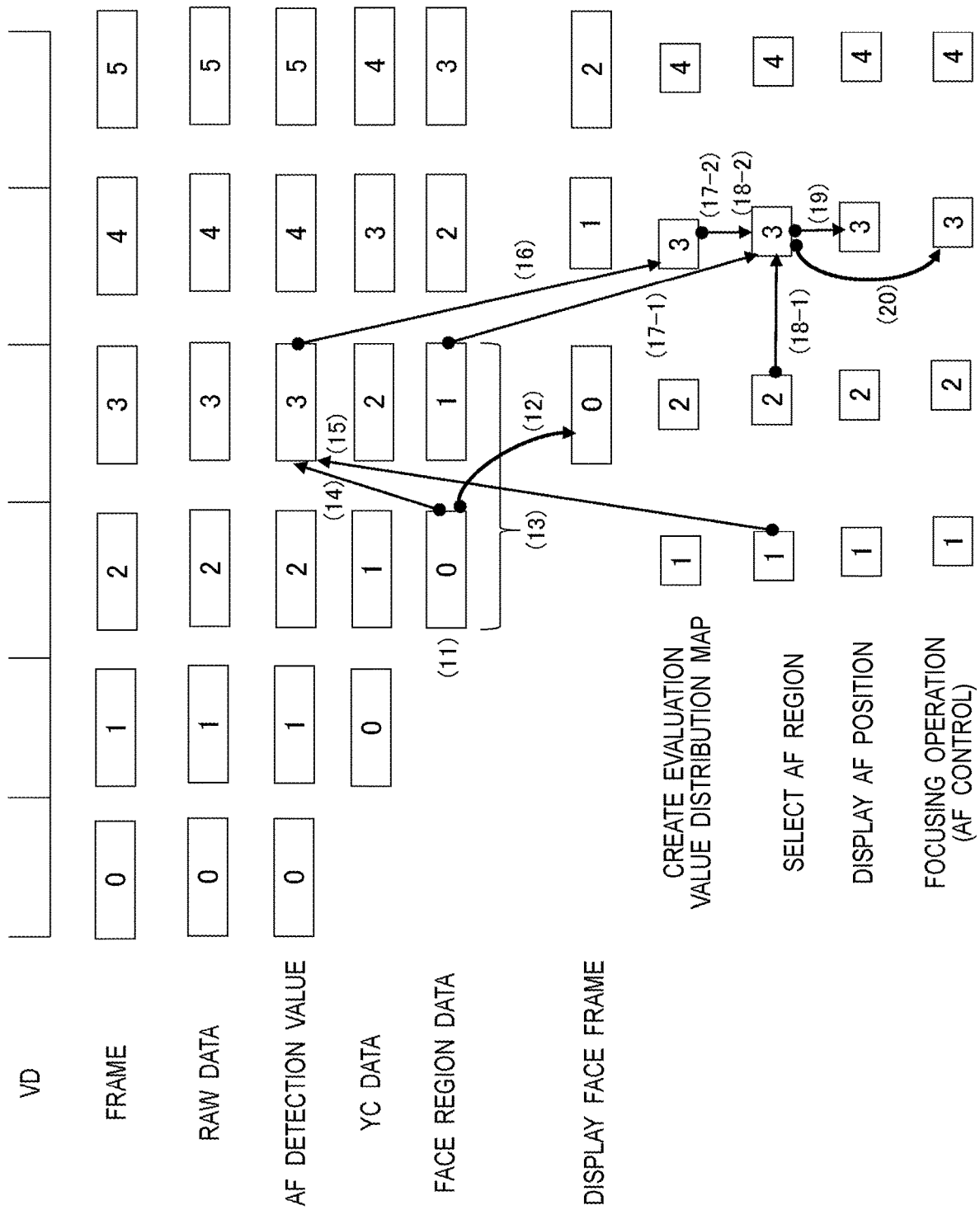
FIG. 10 is a timing chart related to the AF operation presented in the flowchart of FIG. 8.

FIG. 10 illustrates a timing chart regarding the operation flow of steps S11 to S19 described above. In the timing chart presented in FIG. 10, items of "face frame display" and "AF position display" are added in addition to the items of the timing chart presented in FIG. 7.

"Face frame display" represents processing of displaying, onto the display monitor 130, the face region F corresponding to the face region data. As illustrated in FIG. 10, when the face region data is calculated in a certain frame, the face region F corresponding to the face region data is displayed in the next frame. "Face frame display" is delayed by one frame with respect to "face region data", delayed by two frames with respect to "YC data", and delayed by three frames with respect to "RAW data" and "AF detection value".

(11): The controller 135 determines whether or not there is a result of face detection (S11). In the example illustrated in FIG. 10, as a result of the face detection of the second frame, face region data (that is, position information of the face region F) corresponding to the RAW data of the 0th frame is output (YES in S11).

(12): When there is a result of the face detection (YES in S11), the face region F as a face frame is displayed (S12). In the example illustrated in FIG. 10, in response to the output, in the second frame, of the face region data corresponding to the RAW data of the 0th frame, the corresponding face region F is displayed on the captured image Im in the third frame. As a result, a frame delay by three frames in total occurs from the acquisition of the RAW data to the display of the face region F.

(13): The controller 135 determines whether or not the face region F is at the same position in a plurality of frames (S13).

(14): When the face region F is at the same position in the plurality of frames (YES in S13), the controller 135 sets the map region M based on the position of the face region F (S14).

(15): When the face region F is not at the same position in the plurality of frames (NO in S13), or when there is no result of face detection (NO in S11), the controller 135 sets the map region M based on the AF position S1 of the previous frame (S15).

(16): The controller 135 creates the evaluation value map 30 (S16). Specifically, the AF detection value, which is the output result of the third frame, is acquired for each cell constituting the map region M set in (14) and (15).

(17-1), (17-2), (18-1), and (18-2): The controller 135 selects the AF selection region S based on the reference evaluation value of the reference cell Sa in the evaluation value map (S17).

When the evaluation value map 30B created in (16) is set based on the position of the face region F via the processing of (14), the controller 135 determines, as the reference cell Sa, a cell corresponding to the center of the face region F specified in the third frame in the evaluation value map 30B (17-1). In the evaluation value map 30B, a cell(s) having an evaluation value within a range close to the reference evaluation value of the reference cell Sa is selected as the AF selection region S (17-2).

On the other hand, when the evaluation value map 30B created in (16) is set at the same position as the previous frame via the processing in (15), the controller 135 determines, as the reference cell Sa, a cell corresponding to the center of the AF selection region S selected in the third frame in the evaluation value map 30B (18-1). In the evaluation value map 30B, a cell having an evaluation value close to the reference evaluation value of the reference cell Sa is selected as the AF selection region S (18-2).

(19): The controller 135 displays the AF position S1 on the display monitor 130 based on the center of the AF selection region S (S18). Specifically, as illustrated in FIGS. 9A to 9C, the AF position S1 indicating a representative position of the AF selection region S is displayed at a position overlapping the center of the AF selection region S with a graphic (for example, a cross mark) different from that of the face region F.

(20): The controller 135 executes the focusing operation with the evaluation value(s) of the AF selection region S as the AF evaluation value (S19). Specifically, the focusing operation is controlled according to the evaluation values (FIG. 6B) of the evaluation value map 30A in the AF selection region S selected in (17-2) or (18-2).

As described above, "image recognition processing" including creation of face region data is required for "face frame display", and thus a frame delay by three frames in total occurs from the acquisition of RAW data/AF detection value to the display of the face region F. On the other hand, image recognition processing is not required for "AF position display", and the AF selection region S can be selected in the same frame according to the acquisition of the AF detection value, and the AF position S1 indicating the representative position of the AF selection region S can be displayed in the next frame. This allows a delay for "AF position display" to be only a frame delay corresponding to one frame.

By displaying the AF position S1 having a relatively small frame delay, the user can easily recognize that the focusing operation having high followability to the subject 20 is being executed, which leads to improvement in quality of the digital camera 100.

The frame delay of the face region F is not limited to a case of three frames, and is only required to be two or more frames. Even in such a case, by displaying the AF position S1 with a frame delay by only one frame, it is possible to visualize that the follow-up operation having high followability to the subject 20 is being executed.

[1-3. Effects and the Like]

As described above, in the present embodiment, the digital camera 100, which is an example of the imaging device, includes: the image sensor 115 (that is, image sensor) that captures a subject image at a predetermined frame rate and generates imaging data (that is, RAW data) for each frame; and the controller 135 that controls a focusing operation (that is, follow-up operation for following the subject 20) for focusing on the subject 20 on an image for each frame based on the imaging data. For each of imaging data generated by the image sensor 115, the controller 135 selects the AF selection region S (that is, subject region) indicating the follow-up result of the subject 20 in the frame (for example, the current frame) based on the evaluation value distribution information 30 (that is, distribution information) indicating the distribution of the evaluation value with respect to a region on the image of each frame, and uses the selected AF selection region S for control of the focusing operation with respect to the frame.

In the digital camera 100 above, the AF selection region S selected based on the evaluation value distribution information 30 in the image of each frame is used for control of the follow-up operation of the subject 20 with respect to each frame. This makes it possible to execute the follow-up operation of the subject 20 while reducing the influence of the frame delay, and possible to improve the followability to the subject 20.

In the present embodiment, the evaluation value indicates a state of focus in the focusing operation as a follow-up operation, and when selecting the AF selection region S in a specific frame (for example, the current frame), the controller 135 uses, for the focusing operation, the evaluation value with respect to the AF selection region S in the distribution of the evaluation values indicated by the evaluation value distribution information 30 for the frame. This makes it possible to execute the focusing operation while reducing the influence of the frame delay, and possible to achieve the autofocus function having high followability to the subject 20.

In the present embodiment, the controller 135 acquires the evaluation value distribution information 30 within the range of the map region M (candidate region) set on the image, and selects the AF selection region S from the map region M. As a result, the AF selection region S to be used for the focusing operation can be selected after narrowing the region where the subject 20 is highly likely to exist on the image.

In the present embodiment, the digital camera 100 further includes the image recognizer 122 that performs image recognition processing on the captured image Im corresponding to the imaging data and recognizes position information of the subject 20. The controller 135 sets the map region M based on position information of the face region F (that is, position information of the subject 20 recognized by the image recognizer 122), which is a recognition result of the image recognizer 122. As a result, the map region M can be set by a simple method, and by setting the map region M to be wider with respect to the face region F, the map region M can be set so as to include a region where the subject 20 of the current frame is highly likely to exist if the movement of the subject 20 is at a speed to some extent.

In the present embodiment, when the recognition result of the image recognizer 122 cannot be acquired, the controller 135 sets the map region M of the current frame based on the position information of the map region M set in the previous frame of the current frame in place of the position information of the face region F. As a result, even in a case where the recognition result of the subject 20 cannot be acquired, the map region M can be set by a simple method, and the map region M can be set so as to include a region where the subject 20 is highly likely to exist.

In the present embodiment, the controller 135 selects the AF selection region S based on the position information of the face region F (for example, the center of the face region F) that is the recognition result of the image recognizer 122 and the evaluation value distribution information 30B of the current frame in the map region M. As a result, the AF selection region S can be selected so as to include a region where the subject 20 is highly likely to exist.

In the present embodiment, the controller 135 determines whether or not the position shift amount in the plurality of frames of the face region F that is the recognition result of the image recognizer 122 is larger than a predetermined threshold. When further determining that the position shift amount is larger than the predetermined threshold, the controller 135 selects the AF selection region S of the current frame by using the positional information (for example, the center of the AF selection region S of the previous frame) of the AF selection region S selected in the previous frame of the current frame in place of the positional information of the face region F. As a result, in a case where it is assumed that the subject 20 is in motion, by selecting the AF selection region S of the current frame using the position information of the AF selection region S of the previous frame in place of the position information of the face region F that is the recognition result of the image recognizer 122, the AF selection region S can be selected by a simple method while reducing the influence of the frame delay.

In the present embodiment, the evaluation value distribution information 30B is distribution information regarding the deviation value data of the evaluation value. As a result, even when the absolute value of the evaluation value varies depending on the shooting scene or frame, the AF selection region S can be selected while reducing the influence due to the variation.

In the present embodiment, the digital camera 100 further includes the display monitor 130 (that is, display) that displays the captured image Im based on the imaging data. The controller 135 controls the display monitor 130 so as to display the AF selection region S selected based on the evaluation value distribution information 30B. As a result, by displaying the AF selection region S selected based on the evaluation value of the current frame, it is possible to display the focusing region following the motion of the subject 20, and it is possible to give the user a sense of security and improve convenience.

In the present embodiment, the image sensor 115 captures a subject image via the optical system 110 including a focus lens. The controller 135 adjusts the position of the focus lens along the optical axis in the optical system 110 and executes the focusing operation. As a result, when the position of the focus lens is adjusted, the absolute value of the evaluation value for each frame tends to vary, but by controlling the focusing operation using the AF selection region S selected based on the evaluation value distribution information 30 in each frame, the focusing operation can be executed while reducing the influence of the variation in the absolute value of the evaluation value.

In the present embodiment, the digital camera 100, which is an example of an imaging device, includes: the image sensor 115 (that is, image sensor) that captures a subject image at a predetermined frame rate and generates imaging data (that is, RAW data) for each frame; the controller 135 that controls a focusing operation (that is, follow-up operation for following the subject 20) for focusing the subject 20 on the image based on imaging data for each frame; and the display monitor 130 (that is, display) that displays the captured image Im corresponding to the imaging data. The controller 135 controls the display monitor 130 so as to display the face region F (that is, recognition region) indicating the region in which the subject 20 is recognized by image recognition of a specific frame (for example, a frame before the current frame) on the captured image Im of a frame (for example, the current frame) after the frame. The controller 135 further controls the display monitor 130 so as to display the AF selection region S (that is, subject region) indicating a follow-up result of the subject 20 in a frame after the image recognition (for example, the current frame) on the captured image Im of the frame (for example, the current frame) in which the face region F is displayed.

According to the digital camera 100 above, the AF selection region S whose frame delay is less than that in the face region F that is the result of the image recognition is displayed, whereby the level of the following performance of the digital camera 100 can be visualized for the user.

As illustrated in FIGS. 8, 9A to 9C, and 10, the digital camera 100, which is an example of the imaging device, includes the image sensor 115 (that is, image sensor) configured to capture a subject image at a predetermined frame rate and generate imaging data for each frame, and the controller 135 configured to control the display monitor 130 (that is, display) to display the captured image Im corresponding to the imaging data for each frame, wherein the face region F (that is, first follow-up information) can be displayed on the captured image Im in the display monitor 130 with a frame delay (for example, 3 frames) to indicate a result of a first follow-up operation of following the subject 20 on the captured image Im, and the controller 135 generates the AF position S1 (that is, second follow-up information) that is displayed in a delay period (for example, 1 frame) shorter than the frame delay of the face region F to indicate a result of a second follow-up operation different from the first follow-up operation.

According to the digital camera 100 above, by displaying the AF position S1 having a relatively small frame delay on the display monitor 130, the follow-up operation having high followability to the subject 20 can be visualized and easily used by the user.

In the above aspect, the controller 135 executes the image recognition processing as the first follow-up operation.

According to the digital camera 100 above, when the image recognition processing is executed as the first follow-up operation, the frame delay regarding the first follow-up operation easily increases. In such a situation, the AF position S1 indicating the result of the second follow-up operation is displayed, thereby visualizing the follow-up operation having high followability to the subject 20.

In the above aspect, the controller 135 executes, as the second follow-up operation, the processing of selecting the AF selection region S (that is, region of control target) based on the distribution information of the evaluation values in the imaging data.

According to the digital camera 100 above, in the second follow-up operation, processing requiring a plurality of frames such as image recognition processing becomes unnecessary, and the second follow-up operation having high followability to subject 20 can be achieved.

In the above aspect, the controller 135 causes the display monitor 130 to display the AF position S1 (that is, second follow-up information) based on the center of the AF selection region S (that is, region of control target).

According to the digital camera 100 above, the user easily recognizes the follow-up operation having high followability to the subject 20.

In the above aspect, the controller 135 executes the second follow-up operation (that is, selects the AF selection region S (S14, S16, and S17)) using the result (that is, face region F) of the first follow-up operation.

According to the digital camera 100 above, the follow-up operation having a small frame delay can be achieved by combining the first follow-up operation and the second follow-up operation.

In the above aspect, the controller 135 executes the second follow-up operation using the result of the second follow-up operation (that is, AF position S1) (S15, S16, and S17).

According to the digital camera 100 above, the follow-up operation having a small frame delay can be achieved.

In the above aspect, the controller 135 generates the face region F (that is, first follow-up information) that is displayed on the captured image Im in the display monitor 130 (S12).

According to the digital camera 100 above, by displaying the face region F, the difference in frame delay between the face region F and the AF position S1 can be easily understood, and the user can easily understand that the focusing operation having high followability has been successfully executed using the AF position S1.

In the above aspect, the controller 135 executes the automatic focusing control using the second follow-up operation.

According to the digital camera 100 above, it is possible to execute focusing control having less influence of frame delay.

Not limited to the case where the automatic focusing control is executed using the second follow-up operation, automatic exposure control or white balance control may be executed. In other words, the controller 135 may execute at least one of automatic focusing control, automatic exposure control, and white balance control by using the second follow-up operation. As a result, it is possible to achieve control having less influence of frame delay.

In the above aspect, the controller 135 causes the display monitor 130 to display the face region F (that is, first follow-up information) and the AF position S1 (that is, second follow-up information) in different graphics from each other.

According to the digital camera 100 above, the face region F indicating the result of the first follow-up operation and the AF position S1 indicating the result of the second follow-up operation are easily distinguished from each other, and the user can more easily recognize the level of the followability to the subject 20 regarding the second follow-up operation.

In the above aspect, the digital camera 100 further includes the display monitor 130.

Figure 11:
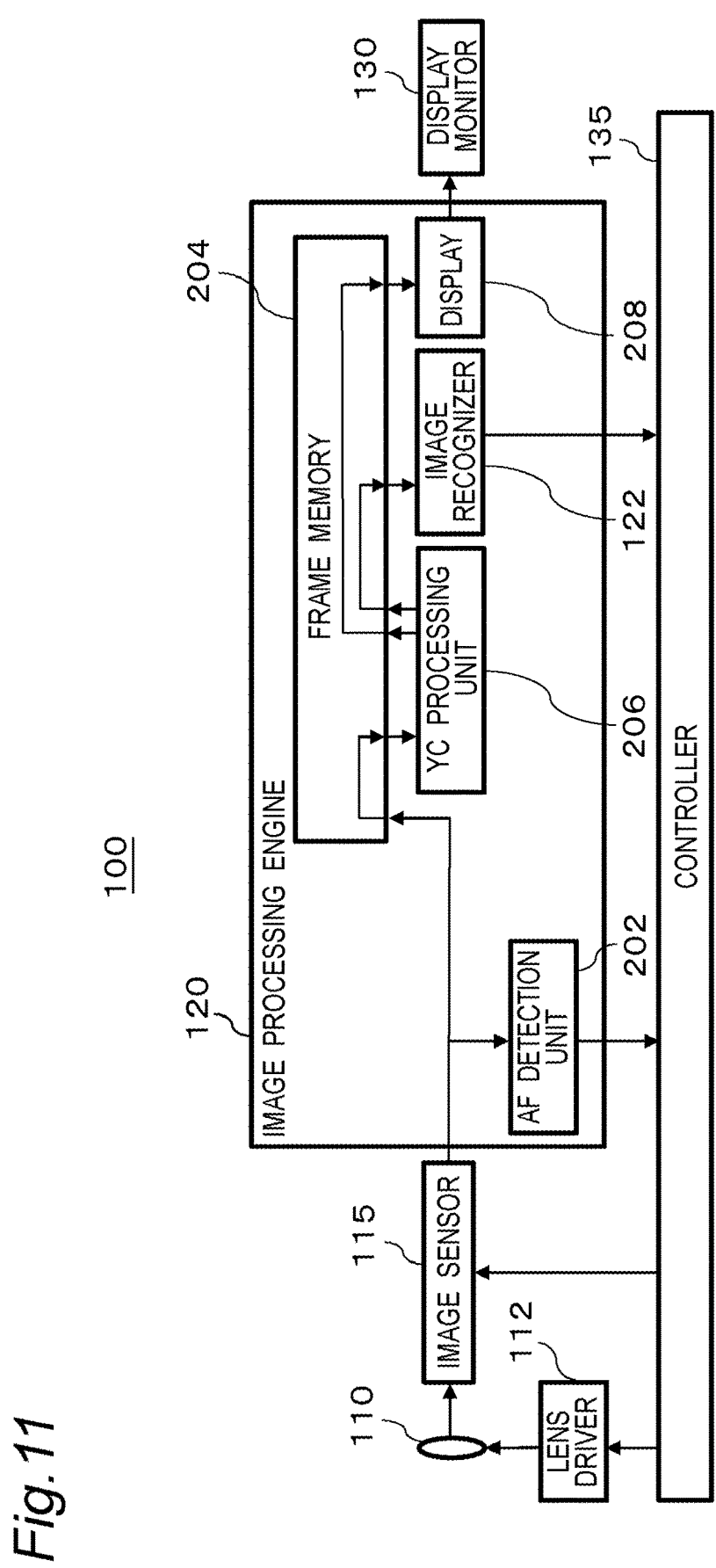
FIG. 11 is a view illustrating in more detail the configuration of the digital camera according to the first embodiment.

Here, in relation to the configuration of the digital camera 100 illustrated in FIG. 1, a more detailed internal configuration of the image processing engine 120 is illustrated in FIG. 11.

The image processing engine 120 illustrated in FIG. 11 includes an AF detection unit 202, a frame memory 204, a YC processing unit 206, and a display 208 in addition to the image recognizer 122.

The AF detection unit 202 acquires an AF detection value (that is, evaluation value) from imaging data output from the image sensor 115. The acquired AF detection value is output to the controller 135 and used for focusing control and creation of an evaluation value map. The frame memory 204 is a storage unit that stores data for each frame. The frame memory 204 stores, for each frame, imaging data output from the image sensor 115 and various data obtained by processing the imaging data. The YC processing unit 206 executes YC conversion processing on the imaging data read from the frame memory 204 and generates YC data. The generated YC data is stored in the frame memory 204 and read by the image recognizer 122 and the display 208. The display 208 displays the captured image Im on the display monitor 130 based on the YC data or the like generated by the YC processing unit 206. The display monitor 130 may be an external display monitor.

Other Embodiments

As described above, the first embodiment has been described as an example of the technology disclosed in the present application. However, the technology in the present disclosure is not limited to this, and can also be applied to embodiments in which changes, replacements, additions, omissions, and the like are made as appropriate. It is also possible to combine the components described in the first embodiment to form a new embodiment.

In the first embodiment, the case where the AF detection value output from the AF detection unit 202 is used when the evaluation value map is created and the AF selection region S is determined has been described. However, the present invention is not limited to such a case, and other information may be used. For example, the AF selection region S can be determined by creating an evaluation value map from numerical information corresponding to a color type.

Figure 12:
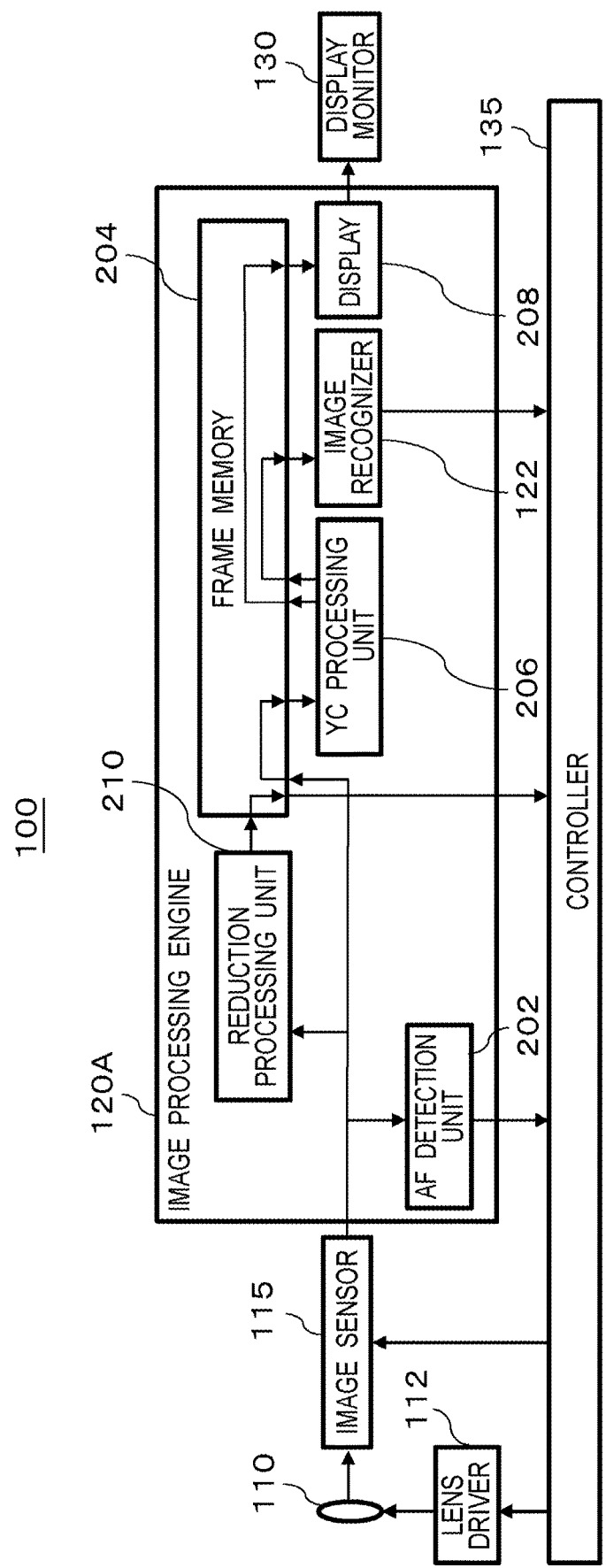
FIG. 12 is a view illustrating a configuration of a digital camera according to a modification of the first embodiment.

In a case where an evaluation value map is created from numerical information corresponding to a color type, an image processing engine 120A illustrated in FIG. 12 includes a reduction processing unit 210 in addition to the configuration of the image processing engine 100 illustrated in FIG. 11.

The reduction processing unit 210 executes predetermined reduction processing on imaging data output from the image sensor 115 and calculates numerical information corresponding to a color type. The calculated numerical information is stored in the frame memory 204 and read by the controller 135, and is used for creation of an evaluation value map and selection of the AF selection region S.

In the first embodiment described above, the digital camera 100 executes the autofocus function of the contrast method, but the present invention is not limited to such a case, and the digital camera may execute an autofocus function of other method. For example, in a case of an autofocus function of an image plane phase difference method, an evaluation value as distance information is acquired for each cell of imaging data generated by the image sensor. Regarding the evaluation value, an evaluation value map regarding the distribution information of the evaluation values illustrated in FIGS. 5A and 6B only needs to be created, and the map region M only needs to be set by a similar method to select the AF selection region S. As a result, even in the case of the image plane phase difference method, the focusing operation can be executed using the focusing region that accurately follows the region of the subject 20, and the autofocus function having high followability to the subject 20 can be achieved.

Figure 13:
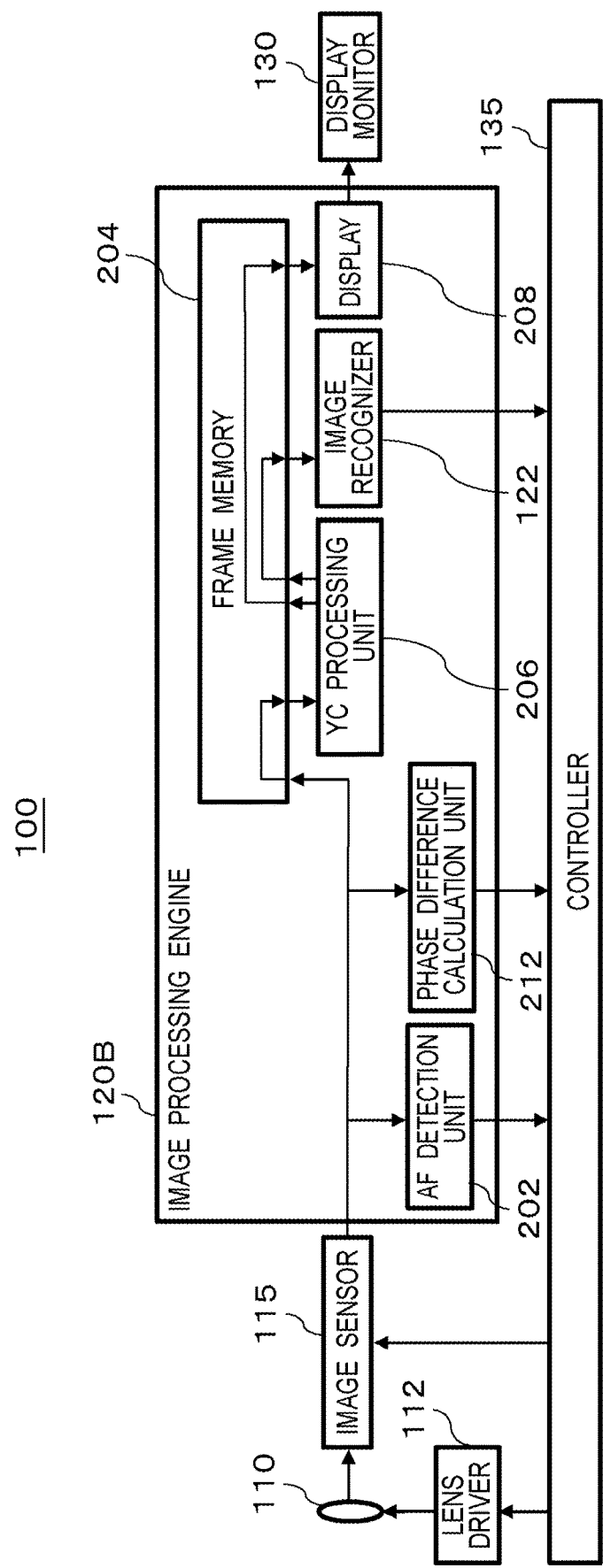
FIG. 13 is a view illustrating a configuration of a digital camera according to another modification of the first embodiment.

In the case where the digital camera 100 executes the autofocus function of the image plane phase difference method, an image processing engine 120B as illustrated in the block diagram of FIG. 13 may be mounted. The image processing engine 120B illustrated in FIG. 13 includes a phase difference calculation unit 212 in addition to the configuration of the image processing engine 100 illustrated in FIG. 11.

The phase difference calculation unit 212 acquires distance information (that is, evaluation value) based on imaging data output from the image sensor 115. The acquired distance information is output to the controller 135, and is used for creation of an evaluation value map and selection of the AF selection region S.

Figure 14:
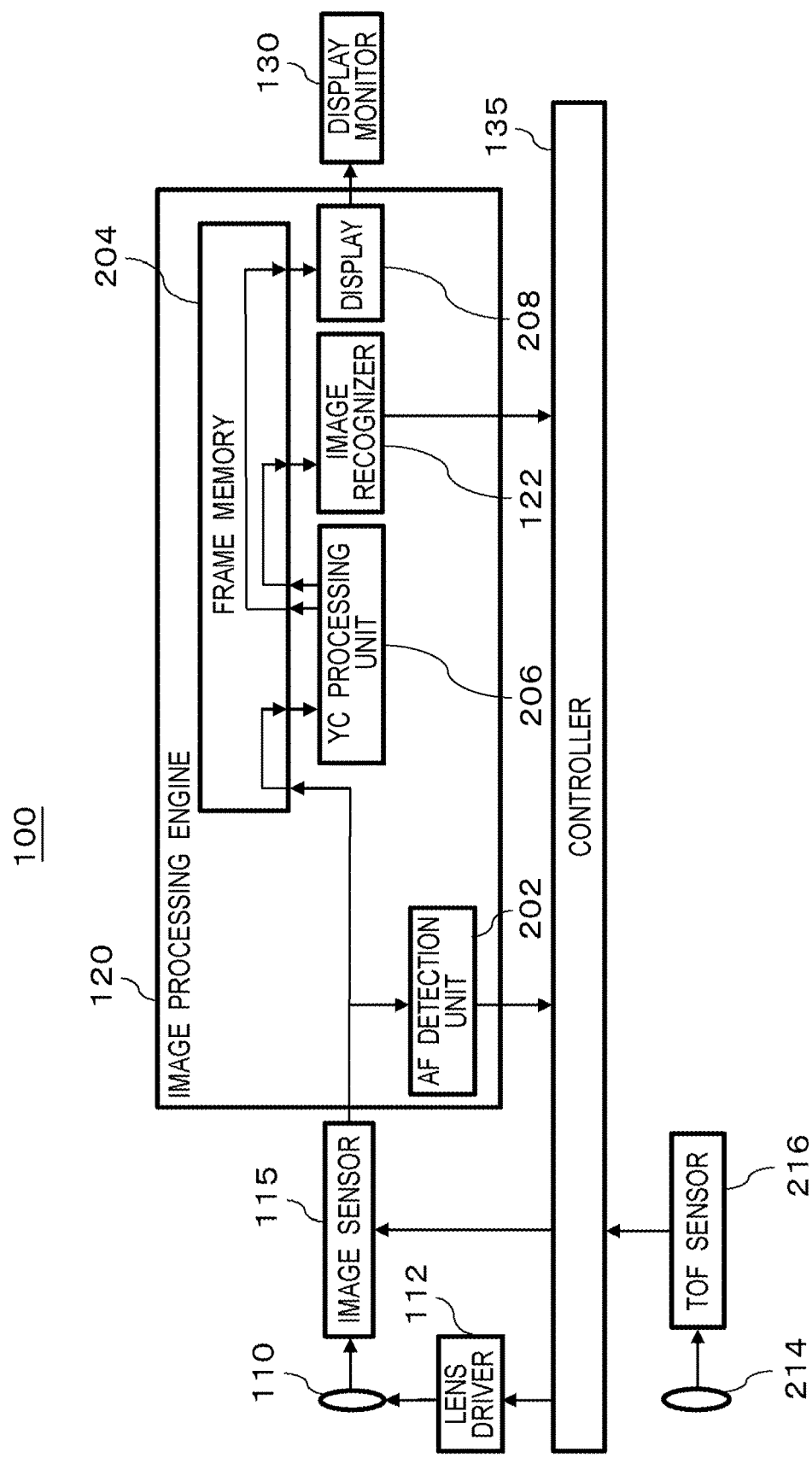
FIG. 14 is a view illustrating a configuration of a digital camera according to still another modification of the first embodiment.

In the first embodiment, the AF detection value output from the AF detection unit 202 is used for creating the evaluation value map and determining the AF selection region S. However, the present invention is not limited to such a case, and other information may be used. For example, the digital camera 100 illustrated in the block diagram of FIG. 14 includes an optical system 214 and a TOF sensor 216, and can create an evaluation value map using a value of a detection result of the TOF sensor 216 and determine the AF selection region S.

The TOF sensor 216 calculates a distance to a subject image formed via the optical system 214 using infrared light. The distance information calculated by the TOF sensor 216 is output to the controller 135, and is used for creation of an evaluation value map and selection of the AF selection region S.

Next, a display example in a case where a plurality of subjects exist will be described with reference to FIGS. 15 and 16.

Figure 15:
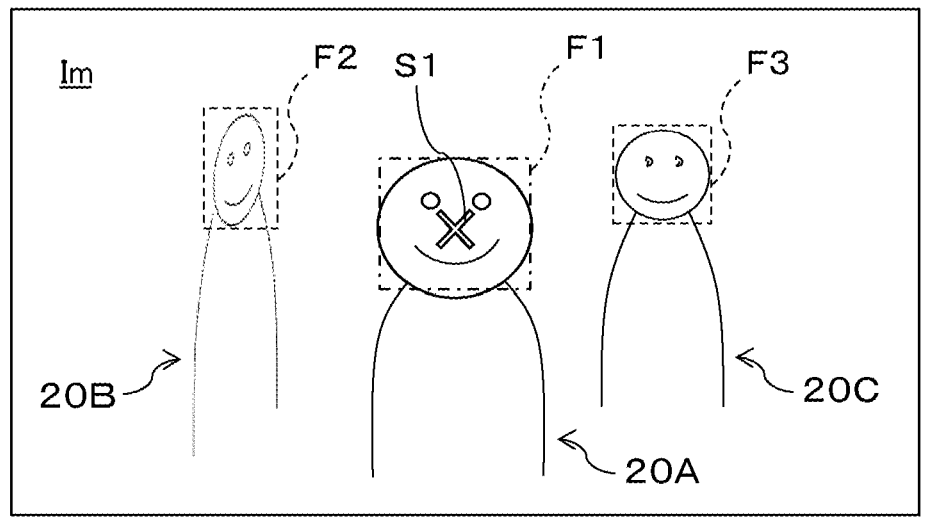
FIG. 15 is a view illustrating an example of a display method in a case where a plurality of subjects exist.

FIG. 15 exemplifies a case where there are three subjects 20. In the example illustrated in FIG. 15, a first subject 20A is positioned at the center, a second subject 20B is positioned on the left side, and a third subject 20C is positioned on the right side. The controller 135 recognizes the respective faces of the three subjects 20A, 20B, and 20C (that is, generates first follow-up information) by face recognition processing, and displays face regions F1, F2, and F3. The controller 135 further selects one main subject 20, that is, one main face region F, in response to determining that the number of faces is plural. The main subject may be selected by any method, and for example, the main subject may be selected based on a feature amount (for example, face direction, eye line direction, distance from the center of the screen, personal authentication, feature amount tracked from the past, and the like) obtained from image data.

In the example illustrated in FIG. 15, the first subject 20A at the center is determined as the main subject. The controller 135 executes "creation of evaluation value map", "selection of AF selection region", "display of AF position", and "AF operation" as illustrated in S13 to S19 of FIG. 8 targeting the face region F1 corresponding to the main subject 20A. As a result, the AF position S1 is displayed corresponding to the main subject 20A (S18). For the second subject 20B and the third subject 20C, which are not the main subjects, AF positions are not displayed, and only the face regions F2 and F3 are displayed.

While the face region F of each of the subjects 20A to 20C is displayed, only the region corresponding to the main subject 20A is displayed for the AF position S1, but the present invention is not limited to such a case. For example, the display method of the AF position S1 may be changed according to the distance between the subjects 20. Specifically, as illustrated in FIG. 16, when the distance between the subjects 20 is short, the AF positions S1, S2, and S3 may be displayed in addition to the face regions F1, F2, and F3 of the subjects 20A to 20C, respectively.

Figure 16:
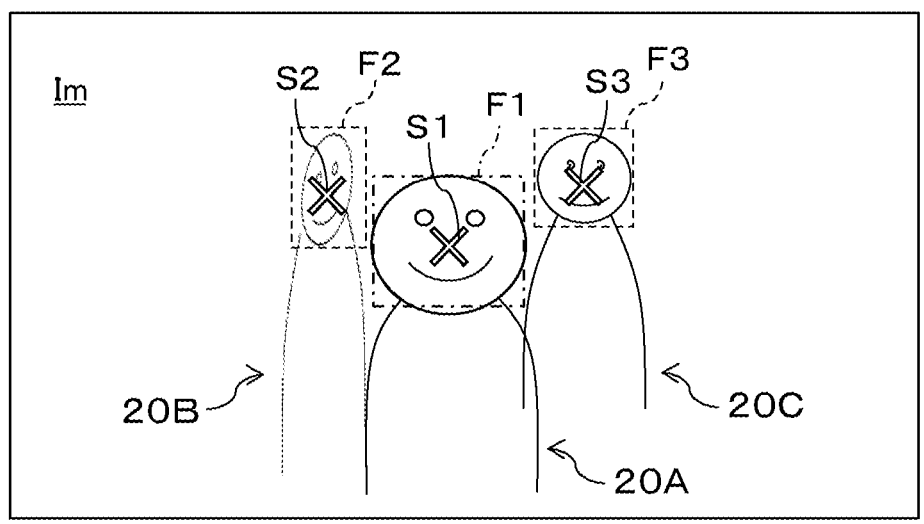
FIG. 16 is a view illustrating an example of the display method in a case where a plurality of subjects exist.

As illustrated in FIGS. 15 and 16, in a case where the plurality of subjects 20 are detected, control may be performed such that display/non-display of the AF position S1 is switched according to whether or not the distance between the subjects 20 (that is, distance to the main subject 20A) is longer than a predetermined distance.

In a case where the motion of the subject 20 is so large that the AF position S1 is positioned outside the face region F, the face region F may be not displayed. This makes it possible to prevent the user from viewing that the face region F is greatly delayed.

As described above, the technology of the present disclosure can be similarly applied as long as an evaluation value as numerical information can be acquired for each cell of imaging data generated by the image sensor 115. The follow-up operation for following the subject 20 is not limited to the focusing operation, and may be a simple detection frame operation, an auto exposure (that is, AE) operation, a white balance control operation, and the like. An imaging device such as the digital camera 100 can be applied to various operations of following the subject 20 for each frame, and an effect of suppressing frame delay in that case is achieved.

In the first embodiment described above, the digital camera 100 includes the optical system 110 and the lens driver 112. The imaging device of the present embodiment may not include the optical system 110 and the lens driver 112, and may be, for example, an interchangeable lens type camera.

In the first embodiment described above, the digital camera has been described as an example of the imaging device, but the present invention is not limited to this. The imaging device of the present disclosure is only required to be an electronic apparatus (for example, a video camera, a smartphone, a tablet terminal, or the like) having an image shooting function.

As described above, the embodiment has been described as an example of the technology in the present disclosure. For this purpose, the accompanying drawings and the detailed description have been provided.

Therefore, some components described in the accompanying drawings and the detailed description can include not only components essential for solving the problem but also components not essential for solving the problem in order to exemplify the above technology. Therefore, it should not be immediately recognized that these non-essential components are essential based on the fact that these non-essential components are described in the accompanying drawings and the detailed description.

Since the above-described embodiment is intended to exemplify the technology in the present disclosure, various changes, replacements, additions, omissions, and the like can be made within the scope of the claims or equivalents thereof.

According to a first aspect, there is provided an imaging device including: an image sensor configured to capture a subject image at a predetermined frame rate and generate imaging data for each frame; and a controller configured to control a display to display a captured image corresponding to the imaging data for each frame, wherein first follow-up information can be displayed on the captured image in the display with a frame delay to indicate a result of a first follow-up operation of following a subject on the captured image, and the controller generates second follow-up information that is displayed in a delay period shorter than the frame delay of the first follow-up information to indicate a result of a second follow-up operation different from the first follow-up operation.

According to a second aspect, there is provided the imaging device according to the first aspect, in which the controller executes image recognition processing as the first follow-up operation.

According to a third aspect, there is provided the imaging device according to the first or second aspect, in which the controller executes, as the second follow-up operation, processing of selecting a region of a control target based on distribution information of evaluation values in the imaging data.

According to a fourth aspect, there is provided the imaging device according to the third aspect, in which the controller causes the display to display the second display information based on a center of the region of the control target.

According to a fifth aspect, there is provided the imaging device according to any one of the first to fourth aspects, in which the controller executes the second follow-up operation using a result of the first follow-up operation.

According to a sixth aspect, there is provided the imaging device according to any one of the first to fifth aspects, in which the controller executes the second follow-up operation using a result of the second follow-up operation.

According to a seventh aspect, there is provided the imaging device according to any one of the first to sixth aspects, in which the controller generates the first follow-up information that is displayed on the captured image in the display.

According to an eighth aspect, there is provided the imaging device according to any one of the first to seventh aspects, in which the controller executes at least one of automatic focusing control, automatic exposure control, and white balance control, using the second follow-up operation.

According to a ninth aspect, there is provided the imaging device according to any one of the first to eighth aspects, in which the controller causes the display to display the first follow-up information and the second follow-up information in different graphics from each other.

According to a tenth aspect, there is provided the imaging device according to any one of the first to ninth aspects, further including the display.

The present disclosure can be applied to an imaging device that performs an operation of following a subject.

What is claimed is:

1. An imaging device including:
an image sensor configured to capture a subject image at a predetermined frame rate and generate imaging data for each frame; and
a controller configured to control a display to display a captured image corresponding to the imaging data for each frame, wherein
the controller performs a first follow-up operation of following a subject on the captured image in order that first follow-up information can be displayed on the captured image in the display with a frame delay to indicate a result of the first follow-up operation, and the controller performs a second follow-up operation of following the subject on the captured image, the second follow-up operation being different from the first follow-up operation, and generates second follow-up information that is displayed in a delay period shorter than the frame delay of the first follow-up information to indicate the result of a second follow-up operation.

2. The imaging device according to claim 1, wherein the controller executes image recognition processing as the first follow-up operation.

3. The imaging device according to claim 1, wherein the controller executes, as the second follow-up operation, processing of selecting a region of a control target based on distribution information of evaluation values in the imaging data.

4. The imaging device according to claim 3, wherein the controller causes the display to display the second display information based on a center of the region of the control target.

5. The imaging device according to claim 1, wherein the controller executes the second follow-up operation using a result of the first follow-up operation.

6. The imaging device according to claim 1, wherein the controller executes the second follow-up operation using a result of the second follow-up operation.

7. The imaging device according to claim 1, wherein the controller generates the first follow-up information that is displayed on the captured image in the display.

8. The imaging device according to claim 1, wherein the controller executes at least one of automatic focusing control, automatic exposure control, and white balance control, using the second follow-up operation.

9. The imaging device according to claim 1, wherein the controller causes the display to display the first follow-up information and the second follow-up information in different graphics from each other.

10. The imaging device according to claim 1, further including the display.

* * * * *